(12) United States Patent
Li et al.

(10) Patent No.: US 8,351,699 B2
(45) Date of Patent: Jan. 8, 2013

(54) METHODS AND APPARATUS FOR AUTO IMAGE BINARIZATION

(75) Inventors: Dalong Li, Houston, TX (US); John Elton, Atlanta, GA (US); Sebastian Steger, Darmstadt (DE)

(73) Assignee: Accusoft Corporation, Tampa, FL (US)

( * ) Notice: Subject to any disclaimer, the term of this patent is extended or adjusted under 35 U.S.C. 154(b) by 508 days.

(21) Appl. No.: 12/642,643

(22) Filed: Dec. 18, 2009

(65) Prior Publication Data

US 2010/0158373 A1 Jun. 24, 2010

Related U.S. Application Data

(60) Provisional application No. 61/138,871, filed on Dec. 18, 2008.

(51) Int. Cl.
*G06K 9/00* (2006.01)
*G06K 9/38* (2006.01)

(52) U.S. Cl. ......................................... 382/172; 382/168

(58) Field of Classification Search .................. 382/168, 382/172
See application file for complete search history.

(56) References Cited

U.S. PATENT DOCUMENTS

| | | | |
|---|---|---|---|
| 6,411,737 B2 * | 6/2002 | Wesolkowski et al. | 382/237 |
| 7,426,291 B2 * | 9/2008 | Okamura | 382/137 |
| 7,526,139 B2 * | 4/2009 | Yamakado et al. | 382/264 |
| 2001/0043748 A1 * | 11/2001 | Wesolkowski et al. | 382/237 |
| 2009/0087040 A1 * | 4/2009 | Torii et al. | 382/118 |

OTHER PUBLICATIONS

J. Sauvola and M. PietikaKinen, "Adaptive document image binarization" Pattern Recognition 33, 2000, pp. 225-236.*

* cited by examiner

*Primary Examiner* — Bhavesh Mehta
*Assistant Examiner* — Utpal Shah
(74) *Attorney, Agent, or Firm* — Straub & Pokotylo; Michael P. Straub; Stephen T. Straub

(57) ABSTRACT

A threshold determination method is selected from among a plurality of alternative global thresholding determination methods and, optionally, a local thresholding determination method based on characteristics of a histogram of grayscales values representing an image. When it is determined to use a global thresholding method, a single global binarization threshold value is determined using the selected global thresholding method. Various alternative global binarization threshold values include a predetermined constant, an average value of the two grayscale values, an Otsu method based threshold value, a Newton method based threshold value, and an Otsu method based threshold value based on a truncated version of the histogram. When it is determined to use local thresholding, a plurality of local binarization threshold values are determined corresponding to different non-overlapping blocks of the image. The determined binarization threshold(s) are applied to the gray scale pixel values to obtain a set of binary pixel values.

20 Claims, 17 Drawing Sheets

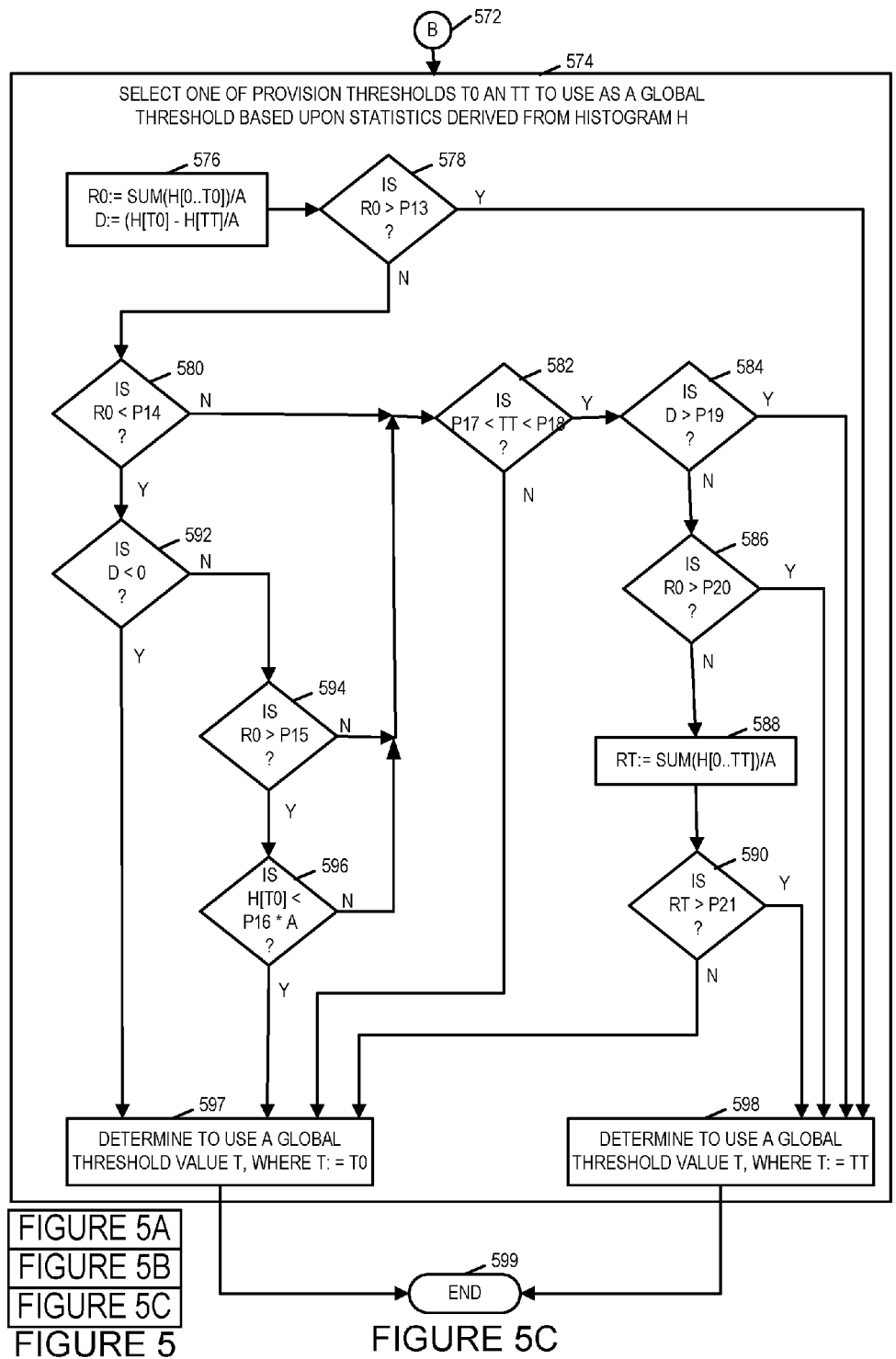

METHODS AND APPARATUS FOR AUTO IMAGE BINARIZATION

RELATED APPLICATIONS

The present application claims the benefit of U.S. Provisional Patent Application Ser. No. 61/138,871 filed on Dec. 18, 2008 and titled "METHODS AND APPARATUS FOR AUTO IMAGE BINARIZATION" which is hereby expressly incorporated by reference in its entirety.

FIELD OF THE INVENTION

Various embodiments relate to image processing, and more particularly to image binarization.

BACKGROUND OF THE INVENTION

Image binarization refers to the process of converting an image represented by pixel values which may assume multiple levels to pixel values which can be one of two values, e.g., a first value corresponding to foreground and a second value corresponding to background. Image binarization can be used convert a gray scale or a color image to a black and white image. One approach to using image binarization is to choose a threshold value and classify each of the pixels with values above this threshold as white, and each of the other pixels as black. Frequently, binarization is used as a pre-processing step before performing optical character recognition (OCR). In fact, most OCR packages on the market work only on bi-level (black & white) images. Binarization also has application in compression, e.g. the binarized image can be used as the mask in the Mixed Raster Content (MRC) model in the JPEG 2000 part 6.

One well known method used to automatically perform histogram shape-based image thresholding is called the Otsu method. The Otsu method assumes that the image to be thresholded contains two classes of pixels (e.g. foreground and background) and then calculates the optimum threshold separating those two classes so that their combined spread (intra-class variance) is minimal.

Otsu's method involves exhaustively searching for the threshold that minimizes the intra-class variance, defined as a weighted sum of variances of the two classes:

$$\sigma_\omega^2(t)=\omega_1(t)\sigma_1^2(t)+\omega_2(t)\sigma_2^2(t)$$

weights $\omega_i$ are the probabilities of the two classes separated by a threshold t and $\sigma_i^2$ variances of these classes.

Otsu shows that minimizing the intra-class variance is the same as maximizing inter-class variance:

$$\sigma_b^2(t)=\sigma^2-\sigma_\omega^2(t)=\omega_1(t)\omega_2(t)[\mu_1(t)-\mu_2(t)]^2$$

which is expressed in terms of class probabilities $\omega_i$ and class means $\mu_i$.

Although the approach of using the Otsu method to obtain a global binarization threshold is efficient in processing some types of images, e.g. bi-modal images, it does not work well in processing all other types of images. Accordingly, it should be appreciated that there is a need for improved image binarization methods.

It would be beneficial if different alternative approaches to selecting a global binarization threshold were available. It would also be advantageous if methods and apparatus were developed which selected, e.g., automatically, an appropriate binarization threshold determination method and obtained a binarization threshold value, e.g., a global or local threshold, to use for the binarization, from among a plurality of alternatives, for at least some types of input images.

In some, but not necessarily all cases, finding one threshold compatible to the entire image is very difficult, and, for some images, may not be possible. Therefore, there is a need, at least in the case of some applications, for methods and apparatus that support determining and using different binarization thresholds for different image sub-blocks for at least some types of images, in addition to supporting global binarization thresholds. Methods and apparatus that determine, e.g., automatically determine, when to use a single global binarization threshold and when to use a plurality of local binarization thresholds would also be beneficial.

SUMMARY OF THE INVENTION

An input image, e.g., a multi-valent image in the form of a color or grayscale image, may be represented by a set of pixel values where the different pixel values may cover a wide range, e.g. 256 possible values. Statistical analysis of the image is performed, e.g., to generate a histogram of pixel values. A threshold determination method is selected from among a plurality of alternative global thresholding determination methods and, optionally, a local thresholding determination method based on characteristics of the histogram. Various histogram characteristics upon which the thresholding selection method is based include one or more of: the number of spikes in the histogram, the size of a spike, a location of a spike, a kurtosis calculation, and a number of clusters in the histogram.

When it is determined to select to use a global thresholding method, a single global binarization threshold value is determined in accordance with a selected global thresholding method. In some embodiments, two or more global thresholding methods are supported. Various alternative global binarization threshold values which may be determined based on the selected threshold determination method include a predetermined constant, e.g., a midpoint value in the gray scale range, an average value of the two grayscale values corresponding to the two highest spikes in the histogram corresponding to the image being processed, an Otsu method based threshold value, a Newton method based threshold value, and an Otsu method based threshold value based on a truncated version of the histogram.

When it is determined to use local thresholding, a plurality of local binarization threshold values are determined corresponding to different non-overlapping blocks of the image. In some embodiments, each of the plurality of local binarization threshold values is an Otsu method based threshold value.

The determined global binarization threshold value or the plurality of determined local binarization threshold values are applied to the pixel values, e.g., grayscale values, representing the image to obtain a set of binary pixel values to represent the image.

An exemplary image binarization method, in accordance with some embodiments, comprises generating statistical information indicating a distribution of pixel values for a set of pixel values representing an image and selecting between a plurality of global binarization threshold determination methods and a local binarization threshold determination method as a function of said generated statistical information. The exemplary method further comprises generating a set of binary pixel values from said set of pixel values representing said image.

An exemplary apparatus for image processing, in accordance with some embodiments, comprises means for generating statistical information indicating a distribution of pixel values for a set of pixel values representing an image and means for selecting between a plurality of global binarization threshold determination methods and a local binarization threshold determination method as a function of said generated statistical information. The exemplary apparatus further comprises means for generating a set of binary pixel values from said set of pixel values representing said image.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
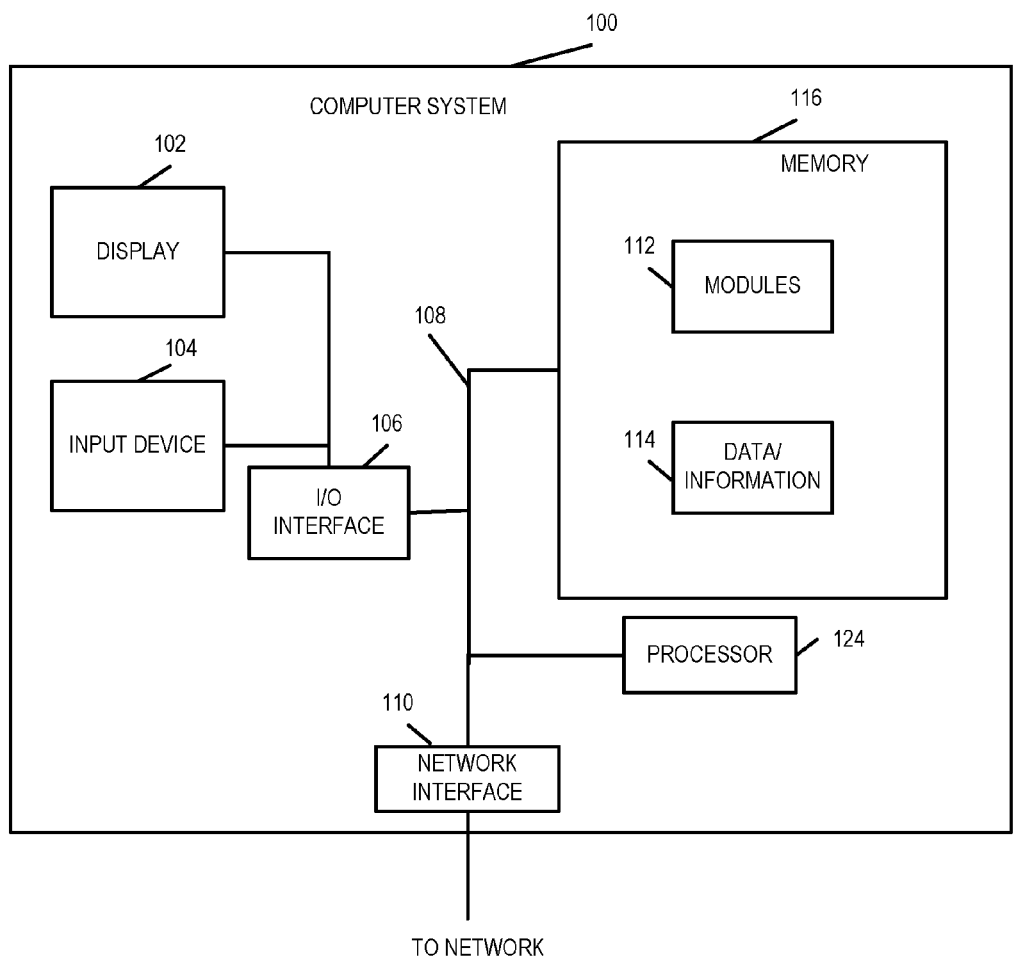
FIG. 1 illustrates a computer system for processing image data implemented in accordance with one embodiment of the present invention.

FIG. 1 illustrates a computer system 100 for processing image data implemented in accordance with one embodiment of the present invention. The computer system 100 includes a display device 102, input device 104, memory 116, processor 124, I/O interface 106, and network interface 110. The display device 102 may be used, e.g., to display images resulting from processing implemented in accordance with the present invention. Input device 104 may be, e.g. a scanner, a keyboard and/or other user input devices. The display and input device are coupled to a bus 108 by I/O interface 106. The bus 108 is also coupled to the memory 116, processor 124 and network interface 110. The network interface 110 couples the internal components of the system 100 to an external network, e.g., the Internet, thereby allowing the system 100 to receive and send image data over a network. The processor 124 controls operation of the computer system 100 under direction of software modules and/or routines stored in the memory 116. Memory 116 includes modules 112 and data/information 114 for implementing one or more image processing methods of the present invention. Resulting image data from image processing in accordance with the present invention is stored in memory 116 for future use and/or communicated to another device. The resulting image data may be retrieved from storage, decoded and displayed or printed. Alternatively the image data may be transmitted to another device for display.

Figure 2:
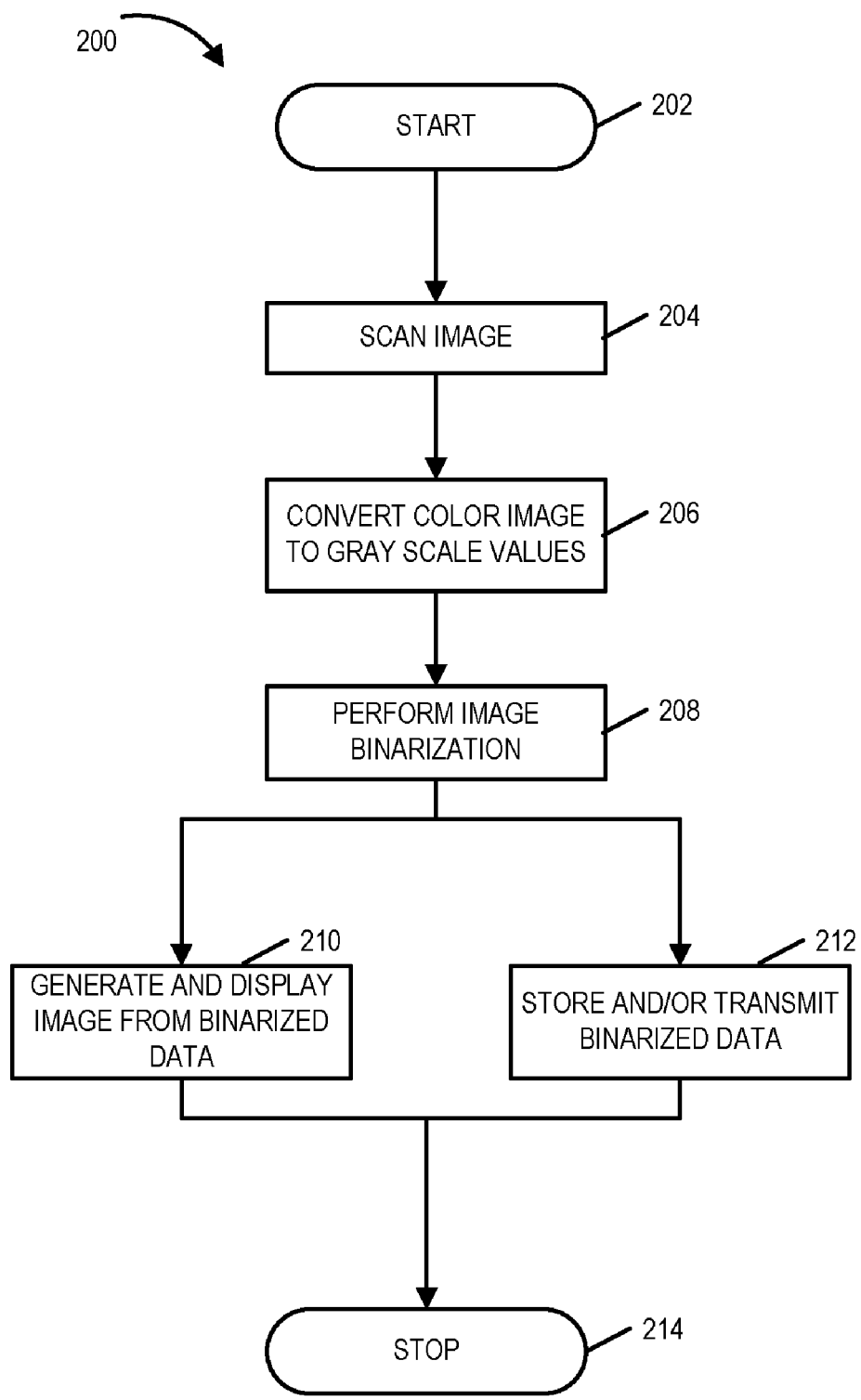
FIG. 2 is a flowchart of an exemplary image processing method in accordance with an exemplary embodiment.

FIG. 2 is a flowchart 200 of an exemplary image processing method in accordance with an exemplary embodiment. The image processing method of flowchart 200 may be performed by the exemplary computer system 100 of FIG. 1. Operation starts in step 202, where the system is powered on and initialized, and proceeds to step 204. In step 204 the image is scanned, e.g., a color image is scanned obtaining a color image representation for each pixel of the image. Operation proceeds from step 204 to step 206. In step 206 the scanned color image is converted to grayscale values, e.g., a set of grayscales values corresponding to the set of pixels of the image is generated. Then in step 208 image binarization is performed in accordance with the present invention. The image binarization converts the set of grayscale data values representing the image into a set of binary data values representing the image. Operation proceeds from step 208 to steps 210 and 212. In step 210 an image is generated and displayed from the binarized data. In step 212 the binarized data is stored and/or transmitted. Operation proceeds from steps 210 and 212 to stop step 214.

Figure 3:
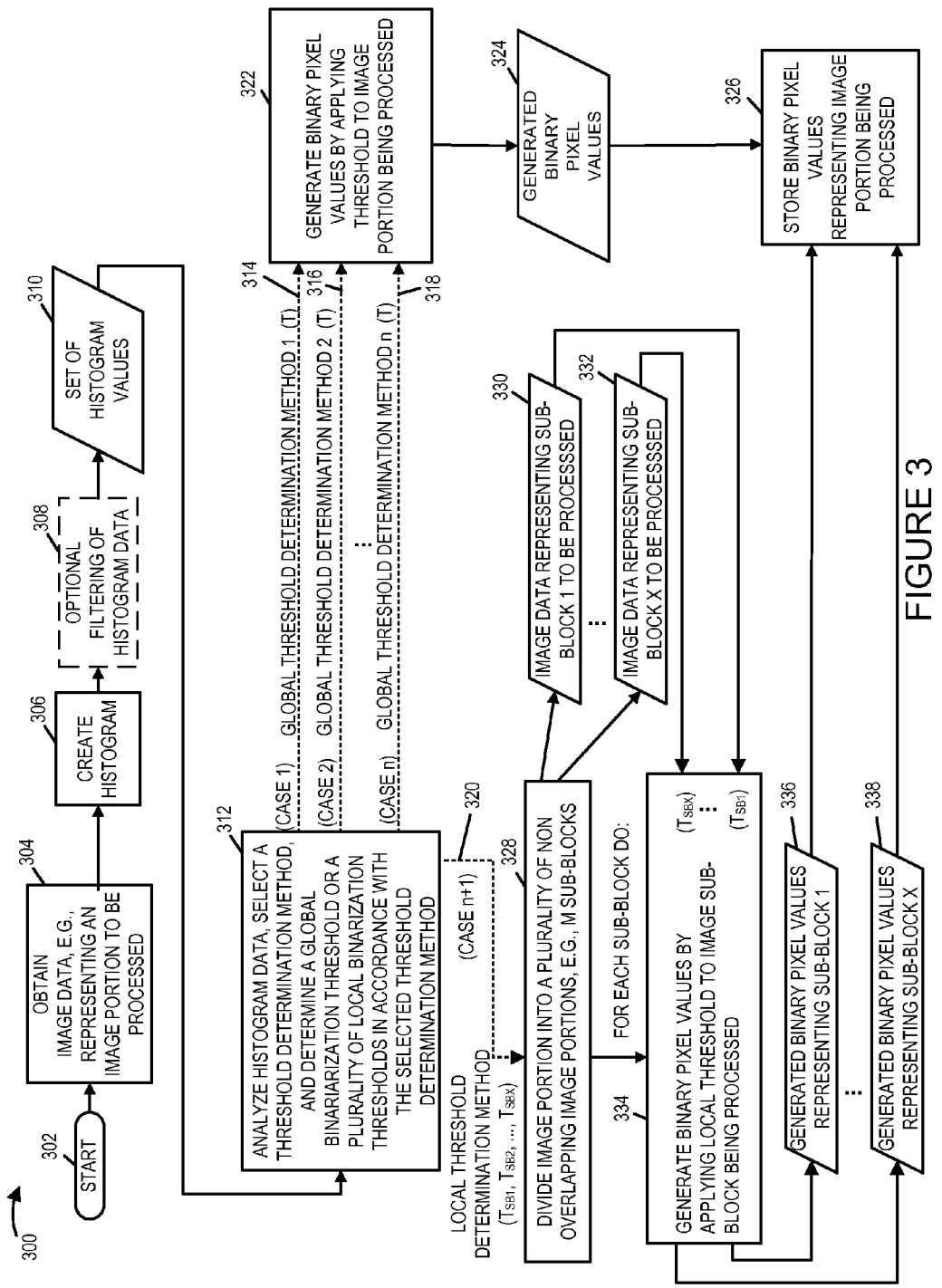
FIG. 3 is a flowchart of an exemplary image binarization method in accordance with an exemplary embodiment of the present invention, which may be used in the image processing method of FIG. 2.

FIG. 3 is a flowchart 300 of an exemplary automatic image binarization method in accordance with an exemplary embodiment of the present invention. The exemplary image binarization method of flowchart 300 is, e.g., an implementation of the image binarization step 208 of image processing method flowchart 200 of FIG. 2.

The image binarization method starts in step 302 and proceeds to step 304. In step 304 image data, e.g., representing an image to be processed is obtained. For example, a set of grayscale pixel values representing the image to be processed is obtained, e.g., one grayscale value corresponding to each pixel of the image. Operation proceeds from step 304 to step 306.

In step 306 a histogram is created from the set of pixel values. For example, the created histogram provides a count of the number of pixels in the image corresponding to each of the possible alternative grayscale values. In some embodiments, there are 256 possible alternative grayscale values. In some embodiments, following step 306, optional step 308 is included, in which the histogram data is subjected to filtering. In some other embodiment, step 308 is omitted. The result of step 306 and/or step 308 is a set of histogram values 310 representing the image.

Operation proceeds to step 312, where the set of histogram data 310 is analyzed to select a threshold determination method and determined a global binarization threshold or a plurality of local binarization thresholds in accordance with the selected threshold determination method. The selection of the threshold determination method to use is performed as a function of statistical information corresponding to the histogram. In this example, there are n alternative global thresholding methods and a local thresholding determination method from among which the selection is performed. Dotted arrow 314 represents exemplary case 1, where global threshold determination method 1 is selected and a single global binarization threshold T is determined. Dotted arrow 316 represents exemplary case 2, where global threshold determination method 2 is selected and a single global binarization threshold T is determined. Dotted arrow 318 represents exemplary case n, where global threshold determination method n is selected and a single global binarization threshold T is determined. Dotted arrow 320 represents exemplary case n+1, where the local threshold determination method is selected. When the local threshold determination method is selected, a set of local binarization thresholds $\{T_{SB1}, T_{SB2}, \ldots, T_{SBX}\}$ are determined corresponding to the X different non-overlapping sub-blocks of the image being processed.

If one of the alternative global thresholding methods is selected in step 312, then operation proceeds from step 312 to step 322; however, if local thresholding is selected, then operation proceeds from step 312 to step 328.

Returning to step 322, in step 322 binary pixel values are generated by applying the determined global threshold value T to the image being processed. For example, the set of image data obtained in step 304, which is a set of grayscale values, is converted to a corresponding set of binary values by applying the determined global threshold value. Generated binary pixel values 324 is an output of step 322. Operation proceeds from step 322 to step 326 in which the generated binary pixel value representing the image are stored.

Returning to step 328, in step 328 the image is divided into a plurality of non-overlapping image portions, e.g., X sub-blocks, (image data representing sub-block 1 to be processed, . . . , image data representing sub-block M to be processed). Operation proceeds from step 328 to step 334, which is performed for each sub-block. In step 334 binary pixel values are generated by applying the local binarization threshold value to the image sub-block being processed. For example image data representing sub-block 1 to be processed is subjected to local binarization threshold value $T_{SB1}$ and generated binary pixel values representing sub-block 1 336 is obtained. Similarly, image data representing sub-block X to be processed is subjected to local binarization threshold value $T_{SBX}$ and generated binary pixel values representing sub-block X 338 is obtained. Operation proceeds from step 334 to step 326, where the generated binary pixel values representing the image are stored.

Figure 5A:
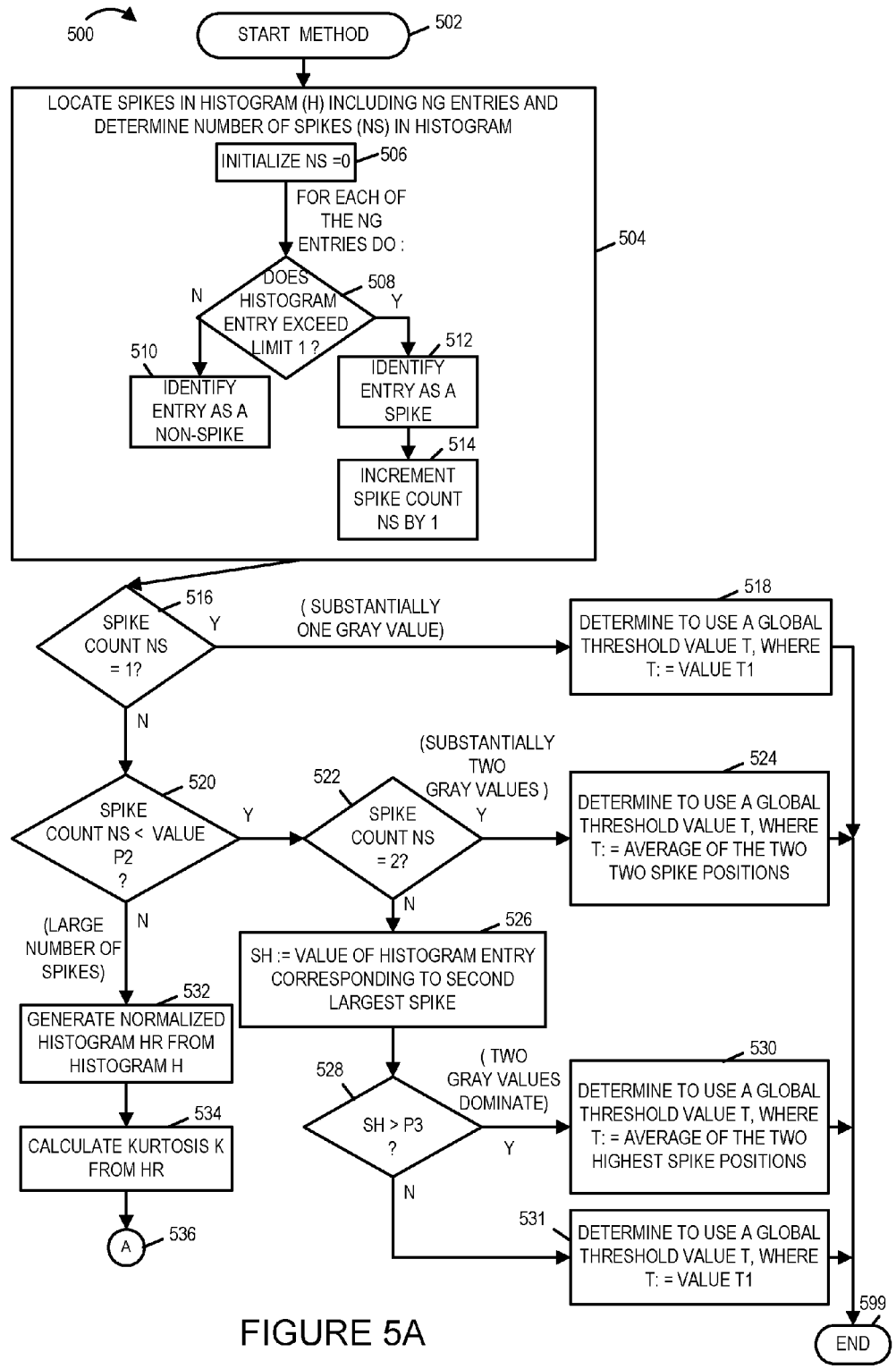
FIG. 5 is a detailed flowchart illustrating an exemplary image binarization method.
Figure 5B:
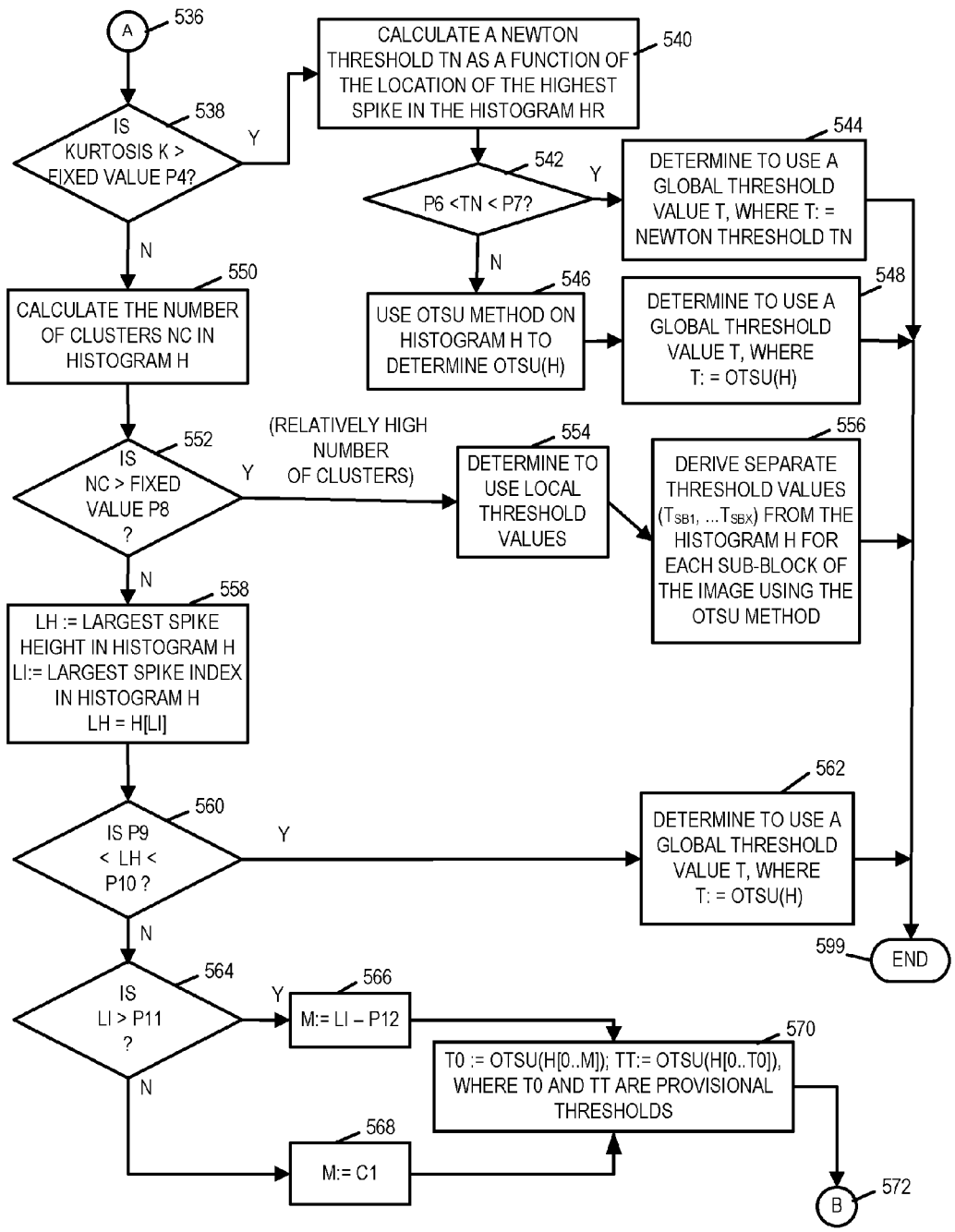

FIG. 5 is a flowchart 500 of an exemplary method for selecting between a plurality of global threshold determination methods and a local threshold determination method and for determining one or more thresholds. The exemplary flowchart 500 may represent one exemplary implementation of step 312 of flowchart 300 of FIG. 3. The threshold determination methods are, e.g., binarization threshold determination methods used for processing a representation of an image represented by a plurality of gray levels. If one of the plurality of global threshold determination methods is selected, a single global threshold value T is determined and subsequently used to process the image. However, if the local threshold determination method is selected, then a set of local threshold values $\{T\}=\{T_{SB1}, T_{SB2}, \ldots, T_{SBX}\}$ are determined and used to process the image, with each local threshold value corresponding to a different sub-block in the image to be processed. Consider that a global histogram table H is an input to the method of flowchart 500, the table including NG entries, each entry in the histogram table H specifying the number of pixels in the image being processed carrying a given gray level value. In one exemplary embodiment NG=256. Also consider that there are A pixels in the original image being processed, where A is an integer.

Operation of the exemplary method starts in step 502 and proceeds to step 504. In step 504, the number of spikes (NS) in the histogram H including NG entries are determined. Step 504 includes steps 506, 508, 510, 512 and 514. In step 506 NS is initialized to 0. Operation proceeds from step 506 to step 508, which is performed for each of the NG entries. In step 508 a histogram entry is compared to limit 1. If the histogram entry being tested in step 508 does not exceed limit 1, then operation proceeds to step 510 where the entry is identified as a non-spike. However, if the histogram entry being tested exceeds entry limit 1, then operation proceeds from step 508 to step 512 in which the entry is identified as a spike. Operation proceeds from step 512 to step 514 in which the spike counter NS is incremented by 1. In some embodiments, Limit 1=P1*A. In one such embodiment P1=1/1000.

Operation proceeds from step 504 to step 516. In decision step 516 the value of spike count NS is compared to 1. If the spike count NS=1, then the image is thereby determined to include substantially a single gray value, which may correspond to a single color, and operation proceeds from step 516 to step 518. In step 518 it is determined to use a global threshold value T, where T=value T1, e.g., a predetermined middle value in the range of possible gray level values. In some embodiments T1=127. Operation proceeds from step 518 to end step 599.

Returning to step 516, if in step 516 the spike count NS does not equal 1, then operation proceeds from step 516 to step 520. In step 520, the spike count NS is compared to value P2. In some embodiments, P2 is a predetermined fixed parameter value greater than 2, e.g., 12. If the spike count NS is less than value P2, then operation proceeds from step 520 to step 522; otherwise, operation proceeds from step 520 to step 532.

Returning to step 522, in step 522 the spike count NS is compared to 2. If NS=2, then the image is thereby determined to include substantially two gray values, which may correspond to two colors, and operation proceeds from step 522 to step 524. In step 524 it is determined to use a global threshold value T, where T=the average of the two spike positions. Operation proceeds from step 524 to end step 599.

Returning to step 522, if in step 522 the spike count NS is not equal to two, then operation proceeds from step 522 to step 526. In step 526 variable SH is set to the height of the second largest previously located spike, as indicated by SH:=value of histogram entry corresponding to the second largest spike. Operation proceeds from step 526 to step 528.

In decision step 528 the value of SH is compared to value P3. In some embodiments P3=$P3_1$*A. In some such embodiments, $P3_1$ is a fixed parameter value, e.g., 0.4. If SH>P3, then the image is thereby determined to be dominated by two gray values, which may correspond to two colors, and operation proceeds from step 528 to step 530. In step 530 it is determined to use a global threshold value T, where T=the average of the two spike positions. Operation proceeds from step 530 to end step 599.

Returning to step 528, if in step 528 SH is not greater than P3, then operation proceeds from step 528 to step 531. In step 531, it is determined to use a global threshold value T, where T=value T1, e.g., a predetermined middle value in the range of possible gray level values. In some embodiments, T1=127. Operation proceeds from step 531 to end step 599.

Returning to step 520, if in step 520 the spike count NS is not less than value P2, then there is a relatively large number of spikes, and operation proceeds from step 520 to step 532. In step 532 a new histogram HR is generated from the original histogram H by renormalizing the original histogram H so that the minimum value of HR is zero while the maximum value is unchanged from H. Operation proceeds from step 532 to step 534.

In step 534 a kurtosis value K is calculated from the renormalized histogram HR which was created in step 532. The kurtosis is defined as $$k = \frac{\mu_4}{\sigma^4}$$

where $\mu_4$ is the fourth moment about the mean and is the standard deviation. Operation proceeds from step 534, via connecting node A 536 to step 538. In step 538, the kurtosis value K is compared to fixed value P4. In some embodiments, P4=20. If the kurtosis value K is greater than P4 then operation proceeds from step 538 to step 540; otherwise, operation proceeds from step 538 to step 550.

Returning to step 540, in step 540 a Newton Threshold TN is calculated as a function of the location of the highest spike in the histogram HR. In some embodiments, TN=ML−(P5*H[ML])/(H[ML]−H[ML−P5]), where P5 is a fixed parameter, and ML is the index value of the highest value H[ML] in the histogram H. In some such embodiments, P5=20. Operation proceeds from step 540 to step 542.

In step 542 the Newton Threshold value TN is compared to fixed parameter values P6 and P7. In some embodiments, P6=10 and P7=220. If the value of TN lies between P6 and P7, operation proceeds from step 542 to step 544; otherwise operation proceeds from step 542 to step 546. Returning to step 544, in step 544 it is determined to use a global threshold value T, where T=the Newton Threshold TN. Operation proceeds from step 544 to end step 599.

Returning to step 546, in step 546, the Otsu method is used on histogram H to determine OTSU(H). Operation proceeds from step 546 to step 548. In step 548 it is determined to use a global threshold value T, where T=OTSU(H). Operation proceeds from step 548 to end step 599.

Returning to step 538, if in step 538, the kurtosis K is not greater than fixed value P4, then operation proceeds from step 538 to step 550. In step 550 the number of clusters NC in histogram H is calculated. In some embodiments, a cluster is a contiguous segment of decreasing histogram values of length at least P22, where P22 is a fixed value. In some such embodiments P22=10. Operation proceeds from step 550 to step 552.

In step 552 the number of clusters NC is compared to a fixed parameter value P8. In some embodiments, P8=4. If the value of NC exceeds P8, then there is a relatively high number of clusters and operation proceeds from step 552 to step 554; otherwise, operation proceeds from step 552 to step 558. Returning to step 554, in step 554, it is determined to use local threshold values. Operation proceeds from step 554 to step 556. In step 556 separate threshold values ($T_{SB1}$, $T_{SB2}$, ..., $T_{SBX}$) are derived from the histogram H of each sub-block of the image using the Otsu method. Operation proceeds from step 556 to end step 599.

Returning to step 558, in step 558 variable LH is set equal to the height of the largest spike in the histogram H and variable LI is set equal to the index value of the largest spike in the histogram H, such that LH=H[LI]. Operation proceeds from step 558 to step 560.

In decision step 560, the largest spike height LH is compared to value P9 and P10. In some embodiments, P9=P9$_1$*A and P10=P10$_1$*A. In some such embodiments, P9$_1$=0.2 and P10$_1$=0.5. If the value of LH lies between P9 and P10, then operation proceeds from step 560 to step 562; otherwise, operation proceeds from step 560 to step 564. Returning to step 562, in step 562 it is determined to use a global threshold value T, where T=OTSU(H). Operation proceeds from step 562 to end step 599.

Returning to step 564, in step 564 LI is compared to a fixed parameter value P11. In some embodiments, P11 is 240. If the value of LI exceeds P11, then operation proceeds from step 564 to step 566; otherwise, operation proceeds from step 564 to step 568. In step 566 value M is set to LI−P12, where P12 is a fixed parameter. In some embodiments, P12=20. Operation proceeds from step 566 to 570. Returning to step 568, in step 568 M is set to fixed constant C1. In some embodiments C1=255. Operation proceeds from step 568 to step 570.

In step 570 a first provisional threshold value T0 is calculated using the Otsu method applied to H[0 ... M], as T0=OTSU(H[0 ... M]). In addition in step 570, a second provisional threshold value TT is calculated using the Otsu method applied to H[0 ... T0], as TT=OTSU(H[0 ... T0]). Operation proceeds from step 570 via connecting node B 572 to step 574.

In step 574 one of the calculated provisional thresholds T0 and TT is selected to be used as a global threshold T based on statistics derived from the histogram H. Step 574 includes steps 576, 578, 580, 582, 584, 586, 588, 590, 592, 594, 596, 597 and 598. In step 576, variable value R0 is calculated as the sum of histogram entries H[0] ... H[T0] divided by A. In addition, in step 576 variable D is calculated as D=(H[T0]−H[TT])/A. Operation proceeds from step 576 to step 578.

In decision step 578, the value of R0 is compared to fixed parameter value P13. In some embodiments, P13=0.9. If R0 exceeds P13, operation proceeds from step 578 to step 598; otherwise operation proceeds from step 578 to step 580.

In decision step 580, the value of R0 is compared to fixed parameter value P14. In some embodiments P14=0.85. If R0 is less than P14, operation proceeds from step 580 to step 582; otherwise operation proceeds from step 580 to step 592.

Returning to step 582, in step 582 the value of TT is compared to the fixed parameter values P17 and P18. In some embodiments, P17=20 and P18=235. If TT lies between P17 and P18, operation proceeds from step 582 to step 584; otherwise operation proceeds from step 582 to step 597.

Returning to step 584, in step 584 the value of D is compared to the fixed parameter value P19. In some embodiments, P19=0.0008. If D exceeds P19, operation proceeds from step 584 to step 598; otherwise, operation proceeds from step 584 to step 586.

In step 586, the value of R0 is compared to fixed parameter value P20. In some embodiments P20=0.5. If R0 exceeds P20 then operation proceeds from step 586 to step 598; otherwise, operation proceeds from step 586 to step 588.

In step 588 the variable RT is calculated as the sum of the histogram entries H[0] ... H[TT] divided by A. Operation proceeds from step 588 to step 590. In step 590 the value of RT is compared to fixed parameter value P21. In some embodiments P21=0.08. If RT exceeds P21, then operation proceeds from step 590 to step 598; otherwise, operation proceeds from step 590 to step 597.

Returning to step 592, in step 592 the value of variable D is compared to 0. If D is less than 0 operation proceeds from step 592 to step 597; otherwise, operation proceeds from step 592 to step 594.

In step 594 the value of R0 is compared to fixed parameter value P15. In some embodiments P15=0.4. If R0 exceeds P15, then operation proceeds from step 594 to step 596; otherwise, operation proceeds from step 594 to step 582.

Returning to step 596, in step 596 the value of H[T0] is compared to P16*A, where P16 is a fixed parameter value. In some embodiments, P16=0.0001. If H[T0] is less than P16A, then operation proceeds from step 596 to step 597; otherwise, operation proceeds from step 596 to step 582.

Returning to step 597, in step 597 it is determined to use a global threshold value T, where T=T0. Operation proceeds from step 597 to step 599.

Returning to step 598, in step 598 it is determined to use a global threshold value T, where T=TT. Operation proceeds from step 598 to end step 599.

FIG. 4, comprising the combination of FIG. 4A, FIG. 4B, FIG. 4C, FIG. 4D, and FIG. 4E, illustrates several exemplary histograms (400, 420, 440, 460, 480) of grayscale values corresponding to different images, which when processed in accordance with an exemplary embodiment of the present invention, select different binarization threshold determination methods. In various exemplary histogram, the horizontal axis corresponds to possible pixel values, e.g., in some embodiments, in the range (0 ... 255). The vertical axis of the histogram represents a count of the number of pixels in the image having the pixel value indicated on the horizontal axis.

Figure 4A:
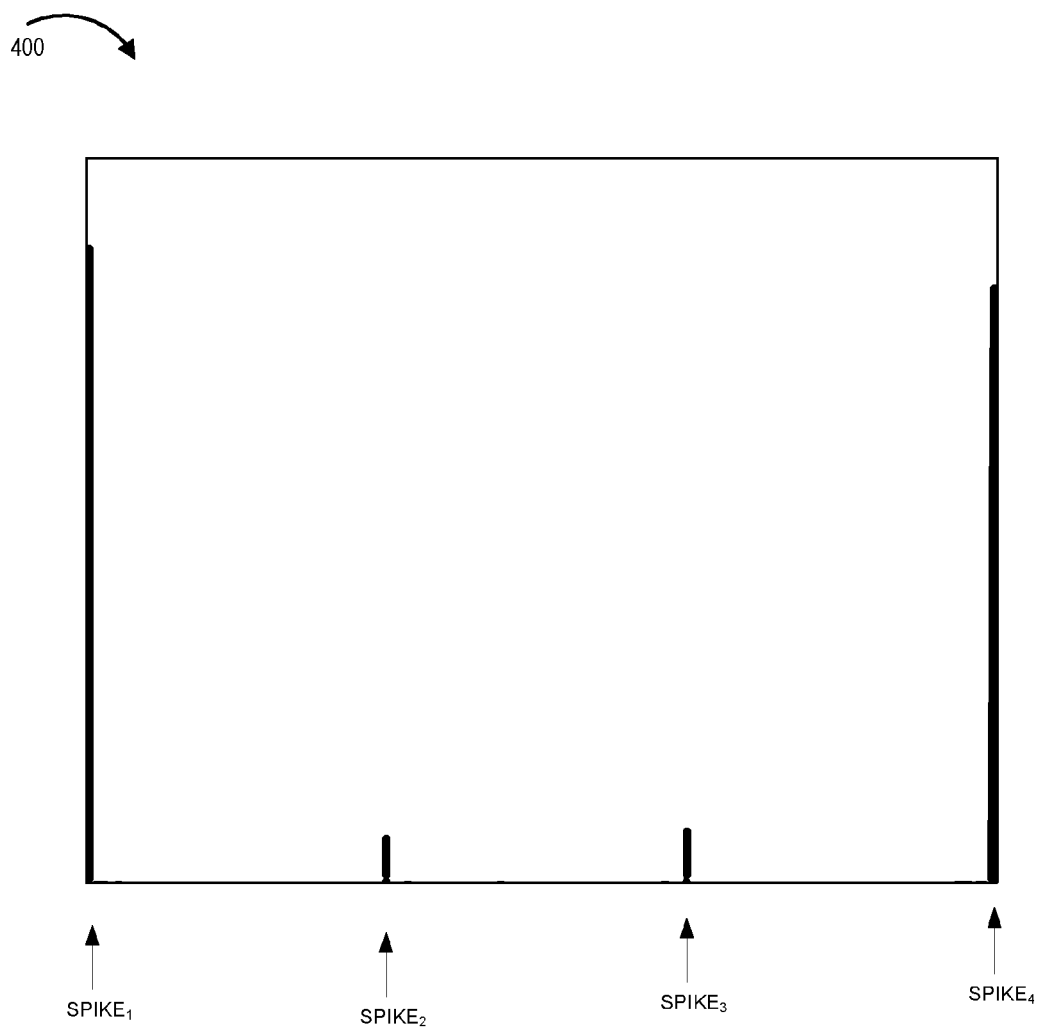
FIG. 4, comprising the combination of FIG. 4A, FIG. 4B, FIG. 4C, FIG. 4D.
FIG. 4E illustrates several exemplary histograms of grayscale values corresponding to different images, which when processed in accordance with an exemplary embodiment of the present invention, select different binarization threshold determination methods.

In the example of FIG. 4A, there are 4 spikes, there are two dominant spikes, and the exemplary method determines to use global binarization thresholding, where the threshold is the average of the two dominant spike indices. The example of FIG. 4A may correspond to an example in which step 530 of flowchart 500 is performed.

Figure 4B:
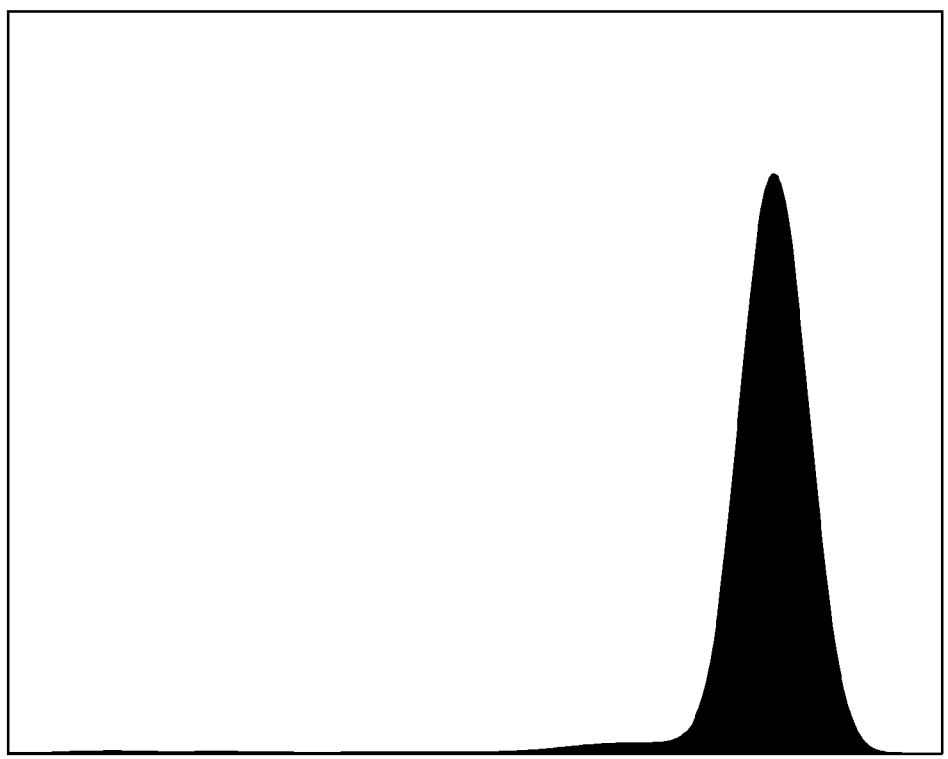

In the example of FIG. 4B, there are 43 spikes and the kurtosis is 42. Consider, for the purposes of this example that the value P2 of step 520 is set to 12 and that the value P4 of step 538 is set to 20. Thus the number of spikes (NS), which is 43, is greater than or equal to P2, which is 12; and the kurtosis K of 42 is greater than the value of P4, which is 20. In this example, the exemplary method determines to use a global binarization thresholding method which is a Newton based thresholding method. In the example of FIG. 4B the histogram was filtered. The example, of FIG. 4B may correspond to an example in which step 544 of flowchart 500 is performed.

Figure 4C:
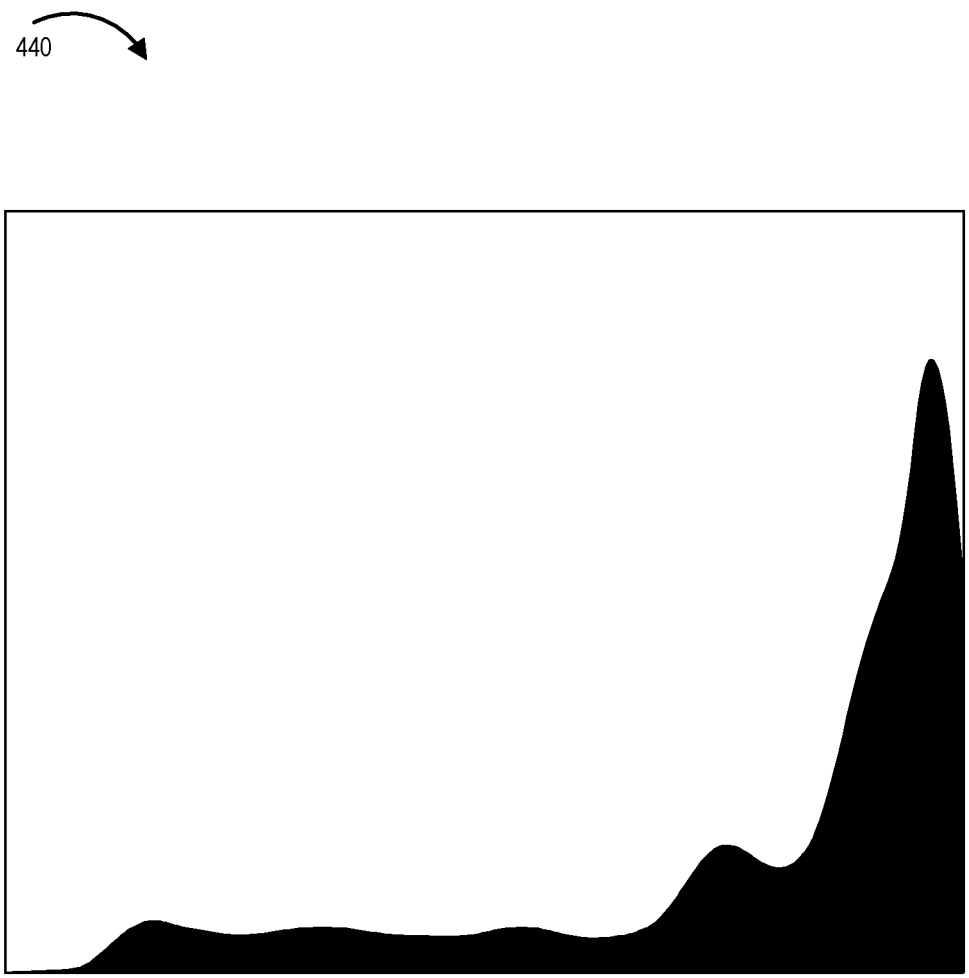

In the example, of FIG. 4C, there are 185 spikes, the kurtosis is 5.1, and there are 5 clusters. Consider, for the purposes of this example that the value P2 of step 520 is set to 12, that the value P4 of step 538 is set to 20, and that the value of P8 of step 552 is set to 4. Thus the number of spikes (NS), which is 185, is greater than or equal to P2, which is 12; and the kurtosis K of 5.1 is not greater than the value of P4, which is 20; and the number of clusters (NC), which is 5 is greater than the value of P8 which is 4. In this example, the exemplary method determines to use local binarization thresholding. In the example of FIG. 4C the histogram was filtered. The example, of FIG. 4C may correspond to an example in which steps 554 and 556 of flowchart 500 are performed.

Figure 4D:
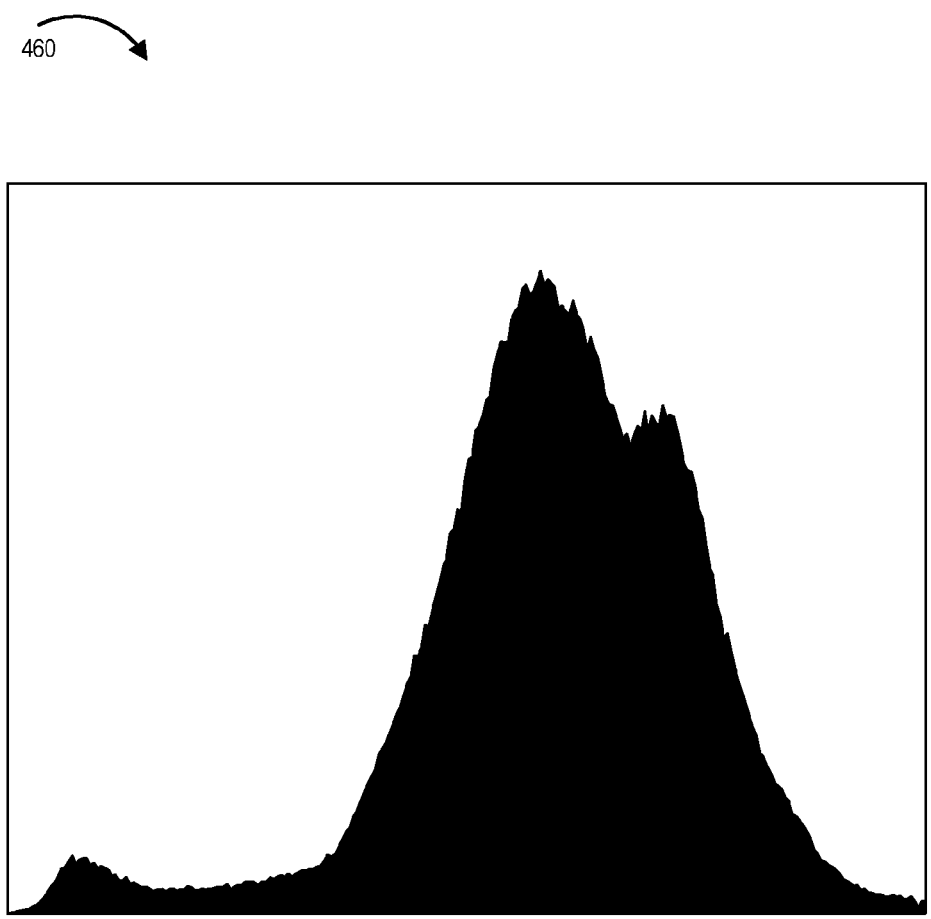

In the example, of FIG. 4D, there are 142 spikes, the kurtosis is 4.7, there are 2 clusters, TT=87, LH=0.012A, and D=0.011. Consider, for the purposes of this example that the value P2 of step 520 is set to 12, that the value. P4 of step 538 is set to 20, that the value of P8 of step 552 is set to 4, that the value of P17 of step 582 is 20, that the value of P18 of step 582 is 235, that P9 of step 560 is 0.2A and that P19 of step 584 is 0.0008. Thus the number of spikes (NS), which is 142, is greater than or equal to P2, which is 12; and the kurtosis K of 4.7 is not greater than the value of P4, which is 20; and the number of clusters (NC), which is 2 is not greater than the value of P8 which is 4; and the value of TT of 88 is between the value P17 which is 20 and the value of P18 which is 235; and the value of LH of 0.012A is not greater than the value of P9 which is 0.2A; and the value of D of 0.011 is greater than the value of P19 which is 0.0008. In this example, the exemplary method determines to global binarization thresholding, where the global threshold value=the value of TT which is 87. The example, of FIG. 4D may correspond to an example in which step 598 of flowchart 500 is performed. The threshold value TT was obtained from a truncated histogram.

Figure 4E:
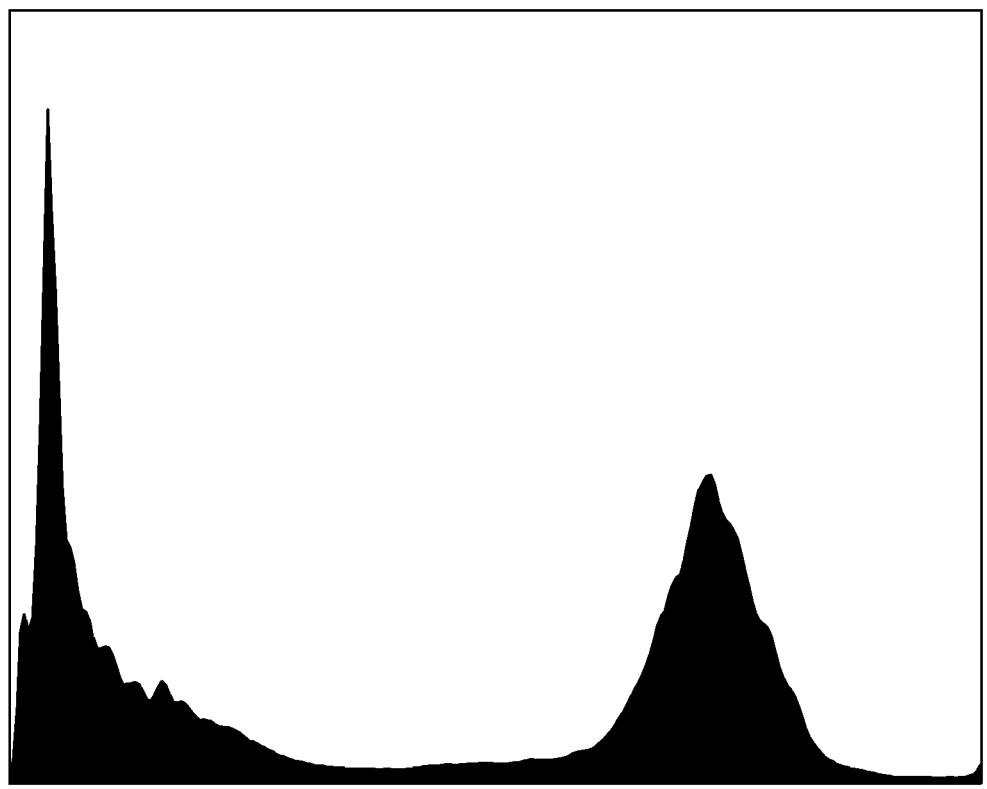

In the example, of FIG. 4E, there are 159 spikes, the kurtosis is 1.3, there are 2 clusters, R0=0.484, LH=0.032A, LI=10, and D=−0.003. Consider, for the purposes of this example that the value P2 of step 520 is set to 12, that the value P4 of step 538 is set to 20, that the value of P8 of step 552 is set to 4, that the value of P14 of step 580 is 0.85, that the value P9 of step 560 is set to 0.2A, that the value of P11 of step 564 is set to 240, and that the value of C1 of step 568 is set to 255. In the example of FIG. 4E, the exemplary method determines to use global binarization thresholding where the global threshold value is T0. In this example, the histogram is a Bimodal histogram and the Otsu method is used.

Figures 6, 6A, 6B:
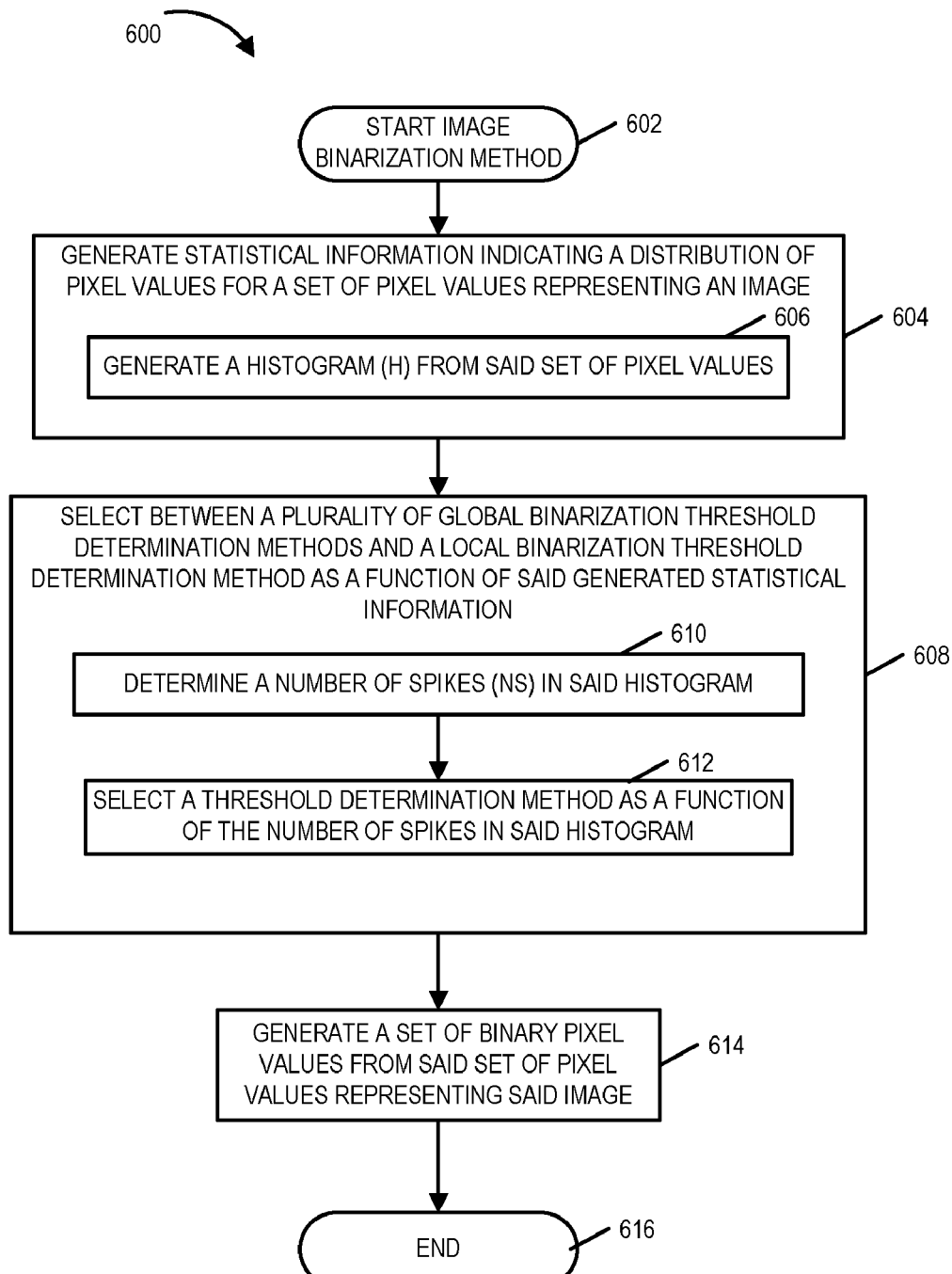
FIG. 6, comprising the combination of FIG. 6A and FIG. 6B, is a flowchart of an exemplary image binarization method in accordance with an exemplary embodiment.
Figure 6B:
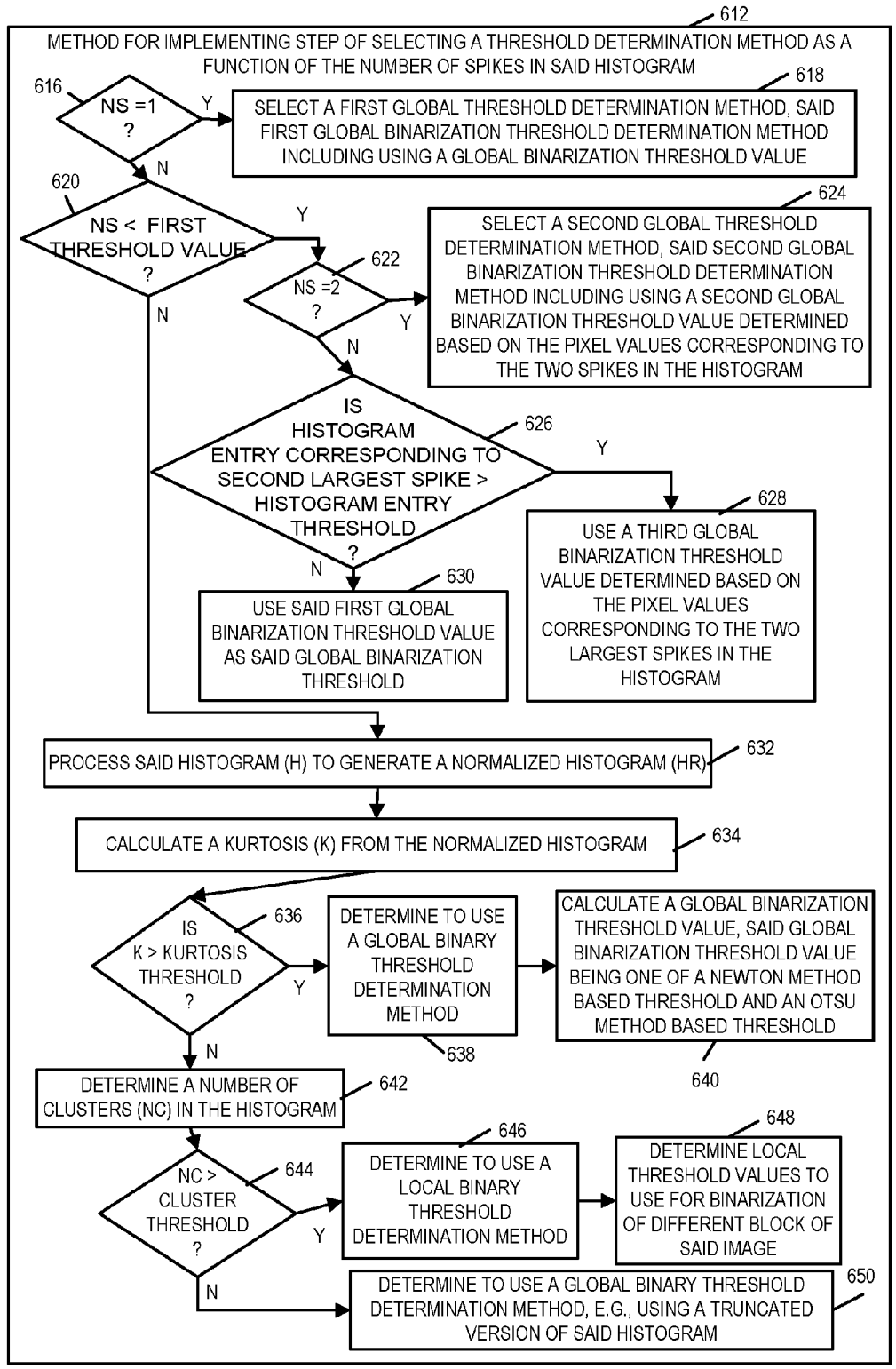

FIG. 6 is a flowchart 600 of an exemplary image binarization method in accordance with an exemplary embodiment. The exemplary image binarization method of flowchart 600 may be implemented by a processor in a general purpose computer.

Operation starts in step 604, where the processor generates statistical information indicating a distribution of pixel values for a set of pixel values representing an image. Step 604 includes sub-step 606 in which the processor generates a histogram (H) from said set of pixel values. Operation proceeds from step 604 to step 608.

In step 608 the processor selects between a plurality of global binarization threshold determination methods and a local binarization threshold determination method as a function of said generated statistical information. Step 608 includes sub-step 610 and sub-step 612. In sub-step 610 the processor determines a number of spikes (NS) in said histogram. Operation proceeds from sub-step 610 to sub-step 612. In sub-step 612 the processor selects a threshold determination method as a function of the number of spikes in said histogram.

Operation proceeds from step 608 to step 614. In step 614 the processor generates a set of binary pixel level values from said set of pixel values representing the image. Operation proceeds from step 614 to end step 616.

FIG. 6B illustrates an exemplary method for implementing sub-step 612 which describes an exemplary method of selecting a threshold determination method as a function of the number of spikes in the histogram. Sub-step 612 includes sub-steps 616, 618, 620, 622, 624, 626, 628, 630, 632, 634, 636, 638, 640, 642, 644, 646, 648, and 650.

In sub-step 616 the processor compares the determined number of spikes (NS) to 1, when the number of spikes equals one, operation proceeds from sub-step 616 to sub-step 618. In sub-step 618 the processor selects a first global threshold determination method, said first global threshold determination method including using a global binarization threshold value. In some embodiments, the global binarization threshold value is a middle value in a range of possible pixel values. For example, in some embodiments the range of possible pixel values may be 0 ... 255, and the global binarization threshold value is 127.

Returning to sub-step 616, if in step 616 the comparison indicates that the number of spikes (NS) is not equal to one, then operation proceeds from sub-step 616 to sub-step 620. In sub-step 620, the processor compares the number of spikes (NS) to a threshold value. If the number of spikes (NS) is less than the threshold value, then operation proceeds from sub-step 620 to sub-step 622. In sub-step 622, the processor compares the number of spikes to 2, and if the number of spikes equals 2, then operation proceeds from sub-step 622 to sub-step 624. In sub-step 624 the processor selects a second global threshold determination method, said second global threshold determination method including using a second global binarization threshold value determined based on the pixel values corresponding to the two spikes in the histogram. In some embodiments, the second global binarization threshold value equals the average of the pixel values corresponding to the two spikes.

Returning to sub-step 622, if in sub-step 622 the comparison indicates that the number of spikes (NS) is not equal to two, then operation proceeds from sub-step 622 to sub-step 626. In sub-step 626, the processor compares the entry corresponding to the second largest spike to a histogram entry threshold. In some embodiments, the histogram entry threshold is P3*A, where P3 represents a constant and A represents the number of pixels in the image. If the histogram entry corresponding to the second largest spike is greater than the histogram entry threshold, then operation proceeds from sub-step 626 to sub-step 628. In sub-step 628 the processor selects to use a third global binarization threshold value based on the pixel values corresponding to the two larges spikes in the histogram. In some embodiments, the third global binarization threshold value equals the average of the pixel values corresponding to the two highest spikes. In some embodiments, the third global binarization threshold value is equal to the second global binarization threshold value.

Returning to sub-step 626, if the comparison of sub-step 626 indicates that the histogram entry corresponding to the second largest spike is not greater than said histogram entry threshold, then operation proceeds from sub-step 626 to sub-step 630. In sub-step 630 the processor selects to use the first global binarization threshold value as the global binarization threshold.

Returning to sub-step 620, if in step 620, the comparison indicates that the number is spikes (NS) is not less then the threshold value, then operation proceeds from sub-step 620 to sub-step 632. In some embodiments, the threshold value is a predetermined constant, e.g., 12. In sub-step 632 the processor processes the histogram (H) to generate a normalized histogram (HR). Then, in sub-step 634 the processor calculates a kurtosis (K) from the normalized histogram. Operation proceeds from sub-step 634 to sub-step 636.

In sub-step 636 the processor compares the kurtosis (K) to a kurtosis threshold. If the kurtosis (K) is greater than a kurtosis threshold then operation proceeds from step 636 to sub-step 638. In sub-step 638 the processor determines to use a global binary threshold determination method, and in sub-step 640 the processor calculates a global binarization threshold value, said global threshold binarization threshold value being one of a Newton method based threshold and an Otsu method based threshold.

Returning to sub-step 636, in sub-step 636 if the comparison indicates that the kurtosis is not greater than the kurtosis threshold then operation proceeds from sub-step 636 to sub-step 642. In sub-step 642 the processor determines a number of clusters (NC) in the histogram. Operation proceeds from sub-step 642 to sub-step 644. In sub-step 644 the processor compares the number of clusters (NC) to a cluster threshold. If the comparison of sub-step 644 indicates that the number of clusters (NC) is greater than the cluster threshold, then operation proceeds from sub-step 644 to sub-step 646.

In sub-step 646, the processor determines to use a local binary threshold determination method. Operation proceeds from sub-step 646 to sub-step 648, in which the processor determines local threshold values to use for binarization of different blocks of said image. In some embodiments the local threshold values are determined using the Otsu method.

Returning to sub-step 644, if in sub-step 644 the comparison indicates that the number of clusters (NC) is not greater than the cluster threshold, then operation proceeds from sub-step 644 to sub-step 650, in which the processor determines to use a global binary threshold determination method. In some embodiments, the global binarization threshold determination method of step 650 uses a truncated version of the histogram.

In some embodiments, the plurality of global binarization threshold determination methods includes a first method which uses a truncated version of said generated histogram, e.g., the method of step 650, and wherein a second one of said plurality of global binarization threshold determination methods is a Newton based threshold determination method, e.g., the method of step 640.

Figure 7:
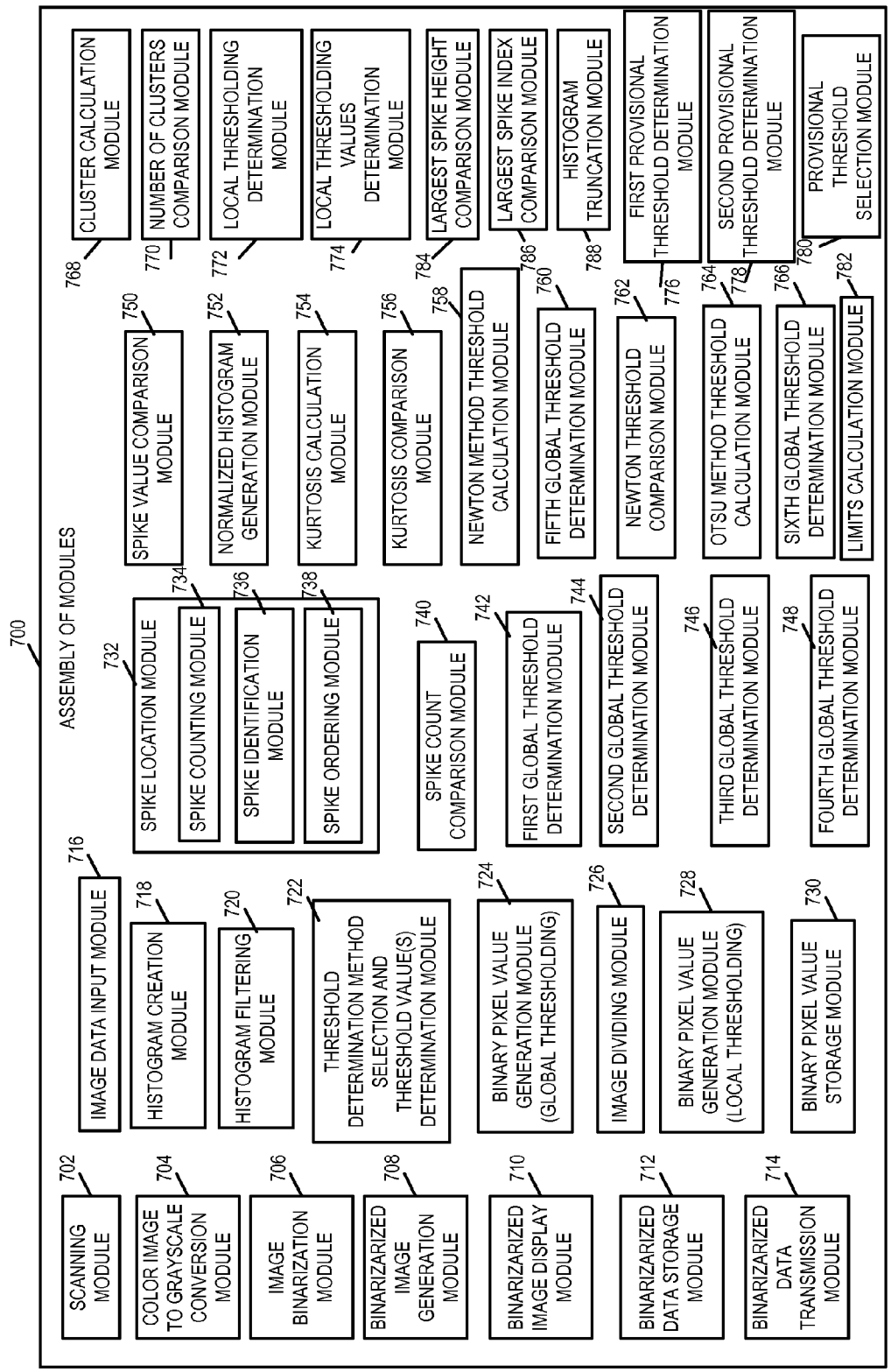
FIG. 7 is a drawing of an assembly of modules 700, which may be included in modules of memory in the exemplary computer system of FIG. 1.

FIG. 7 is a drawing of an assembly of modules 700, which may be included in modules 112 of memory 116 in computer system 100 of FIG. 1. Assembly of modules 700 includes a scanning module 702, a color image to grayscale conversion module 704, an image binarization module 706, a binarized image generation module 708, a binarized image display module 710, a binarized data storage module 712, and a binarized data transmission module 714. Scanning module 702 controls a scanner device to scan an image, e.g., a color image, and obtain a set a set of data representing the scanned image. Color to grayscale conversion module 704 converts color image data, obtained by scanning module 702, to a set of grayscale values corresponding to the image, e.g., one grayscale value per pixel. Image binarization module 706 converts a grayscale data representation of an image into a binary value representation of the image, e.g., converting grayscale pixel values to binary pixel values. Binarized image generation module 708 generates a image from the binarized data obtained from the image binarization module 706. Binarized image display module 710 controls output of the generated image from the binarized data, e.g., to a display device 102. Binarized data storage module 712 controls storing of the binarized image obtained from the binarized data, e.g., in data/information 114 in local memory 116 and/or at a remote storage device. Binarized data transmission module 714 controls transmission of an image obtained from the binarized data, e.g., via network interface 110 to another device via a network.

Assembly of modules 700 also includes an image data input module 716, a histogram creation module 718, a histogram filtering module 720, a threshold determination method selection and threshold value(s) determination module 722, a binary pixel value generation module 724, an image dividing module 726, a binary pixel generation module 728, and a binary pixel value storage module 730. Image data input module 716 obtains image data representing an image to be processed, e.g., obtains grayscale image data representing an image to be processed, e.g., one grayscale value per pixel in the image to be processed. Histogram creation module 718 creates a histogram using the image obtained from module 704, e.g., a histogram with one entry for each of the alternative grayscale values, where the value of the entry is the number of pixel values which have that particular grayscale value. Optional histogram filtering module 720, when included, filters the created histogram. Threshold determination method selection and threshold value(s) determination module 722 analyzes the histogram data, selects a threshold determination method, and determines a global binarization threshold or a plurality of local binarization thresholds in accordance with the selected threshold determination method. Binary pixel value generation module 724, generates binary pixel values by applying a determined global binarization threshold value to image data, e.g., grayscale pixel values corresponding to an image being processed. Image dividing module 726 divides an image into a plurality of non-overlapping image portion, e.g., sub-blocks. Binary pixel value generation module 728 generates binary pixel values corresponding to a sub-block of an image, by applying a determined local binarization threshold to image data corresponding to the sub-block, e.g., grayscale pixel values corresponding to the sub-block of the image being processed. Binary pixel storage module 730 stores binary pixel values representing the image which is being processed, e.g., stores the output data from module 724 or module 728.

Assembly of modules 700 also includes a spike location module 732, a spike comparison module 740, a first global threshold determination module 742, a second global threshold determination module 744, a third global threshold determination module 746, and a fourth global threshold determination module 748. Spike location module 732 identifies spikes in a histogram being analyzed, counts the number of spikes identified and orders the spikes. Spike location module 732 includes spike counting module 734, spike identification module 736 and spike ordering module 738. Spike identification module 736, identifies spikes as histogram entries which exceed a limit, e.g., limit 1. In various embodiments, limit 1 is set such that the histogram has at least 1 spike. Spike identification module 736 also stores the location and height value corresponding to each detected spike. Spike counting module 734 counts the total number of spikes in the histogram being analyzed. Spike ordering module 738 creates an ordered list of the detected spikes, e.g., from the highest spike to the lowest spike.

Spike count comparison module 740 compares the number of spikes (NS) to various limits, e.g., 1, 2, value P2, and controls operation as a function of the result of the comparison. First global threshold determination module 742 determines to use a global threshold value, and set the global threshold value T to value T1, e.g., a midrange value in the range of possible grayscale values, e.g., when the number of spikes is one. Second global threshold determination module 744 determines to use a global threshold and sets the global threshold to an average value of the two spike positions, e.g., when the number of spikes is two. Third global threshold determination module 746 determines to use a global threshold value and sets the global threshold value to an average of the two highest spike positions, e.g., when the number of spikes is greater than or equal to three and less than a value P2 the value of the histogram entry corresponding to the second highest spike is above threshold P3. In this scenario the two highest spikes dominate. Fourth global threshold determination module 748 determines to use a global threshold and sets the global threshold to value T1, e.g., when the number of spikes is greater than or equal to three and less than a value P2 and the value of the histogram entry corresponding to the second highest spike is not greater than value P3.

Assembly of modules 700 further includes a spike value comparison module 750, a normalized histogram generation module 752, a kurtosis calculation module 754, a kurtosis comparison module 756, a Newton method threshold calculation module 758, a fifth global threshold determination module 760, a Newton threshold comparison module 762, an Otsu method threshold calculation module 764, and a sixth global threshold determination module 766. Assembly of modules 700 also includes a cluster calculation module 768, a number of clusters comparison module 770, a local thresholding determination module 772, a local thresholding values determination module 774, a first provisional threshold determination module 776, a second provisional threshold determination module 778 and a provisional threshold selection module 780.

Spike comparison module 750 compares an identified spike to a limit, e.g., compares the second highest spike to a value P3 and controls operation as a function of the result of the comparison. Normalized histogram generation module 752 generates a normalized histogram from a histogram of grayscale values representing the image. Kurtosis calculation module 754 calculates a kurtosis from the normalized histogram. Kurtosis comparison module 756 compares the calculated kurtosis value to a fixed value, e.g., constant P4 where P4=20. In various embodiments, the kurtosis comparison module 756 controls operation as a function of its comparison result, e.g., controls a Newton based threshold to be calculated when the kurtosis exceeds the fixed value P4.

Newton method threshold calculation module 758 calculates a global binarization threshold value, using a Newton based method, as a function of the location of the highest spike in the histogram. Newton threshold comparison module 742, compares the calculated Newton based threshold to determine whether or not it is in an acceptable range, and controls operation based on its comparison. For example, module 762 determines if the Newton threshold value is between two predetermined constants P6 and P7, e.g., 20 and 220. The two predetermined constants P6 and P7 are within the range of possible grayscale values, where P7>P6. Fifth global threshold determination module 760 determines to use a global threshold where the global binarization threshold value is the calculated Newton based threshold, e.g., when the comparison module 762 determines that the Newton based threshold is within the acceptable range. Otsu method threshold calculation module 764 uses the Otsu method on the histogram to determine a global binarization threshold value. Sixth global threshold determination module 766 determines to use a global threshold value, where the global binarization threshold value is the Otsu method based global binarization threshold value from module 764, e.g., when module 762 determines that the calculated Newton based threshold is not within the acceptable range.

Cluster calculation 768 module calculates the number of clusters in the histogram. In some embodiments, a cluster is a contiguous segment of decreasing histogram values of length at least P22, where P22 is a fixed value. In some such embodiments P22=10. Number of clusters comparison module 770 compares the number of clusters to a fixed value, e.g., the value of constant P8 where P8=4, and controls operation as a function of the result of the comparison. Local thresholding determination module 772 determines to use local binarization threshold values, e.g., corresponding to different sub-blocks of the image, e.g., when the comparison module 770 indicates that there are a relatively large number of clusters. Local thresholding values determination module 774 determines a set of local binarization thresholds $\{T_{SB1}, T_{SB2}, \ldots T_{SBX}\}$ corresponding to different sub-blocks of the image being processed, e.g., using the Otsu method.

First provisional threshold determination module 776 determines a first provisional threshold, e.g., T0 using the Otsu method, where T0 may be, and sometimes is based on a truncated version of the histogram representing the image. Second provisional threshold determination module 778 determines a second provisional threshold, e.g., TT, using the Otsu based method as a function of the first provisional threshold T0. Provisional threshold selection module 780 selects one of the first and second provisional thresholds to use as a global binarization threshold value based upon statistics derived from the histogram.

Limits calculation module 782, calculates various limits used by various modules, e.g., as a function of the number of pixels A in the image and/or as a function of other variable such as the number of grayscale levels (NG). For example, limits calculation module 782 calculates a limit 1 used to identify spikes in the histogram. In some embodiments, Limit 1=P1*A, where A equals the number of pixels in the image represented by the histogram. In one such embodiment P1=1/1000.

Assembly of modules 700 further includes a largest spike height comparison module 784, a largest spike height index comparison module 786 and a histogram truncation module 788. Largest spike height comparison module 784 compares the largest height spike in the histogram to two values, e.g., P9 and P10, to determine whether or not the largest spike height is within the range, e.g., between P9 and P10, and controls operation as a function of the determination. Largest spike index comparison module 786 compares the index of largest height spike to a predetermined value near the end of the range of possible grayscale values, e.g., the predetermined value P11 is set to 240 where the range of possible grayscale values is 0 . . . 255. Largest spike index comparison module 786 controls operation as a function of the result of its comparison. Histogram truncation module 788 determines a truncation point to truncation the histogram as a function of the largest spike index in the histogram, e.g., the truncation point is 20 below the largest spike index in the histogram. The determined truncation point, may be, and sometimes is used by first provisional threshold determination module 776 and/or second provisional threshold determination module 778. For example, a determined truncation point in the histogram may be, and sometimes is, used by the first provisional threshold determination module 778 as an upper limit in the Otsu based method calculation.

Although illustrated as separate modules in FIG. 7, in some embodiments, some of the modules of assembly 700 may be implemented as sub-modules within other modules in the assembly of modules 700.

Figure 8:
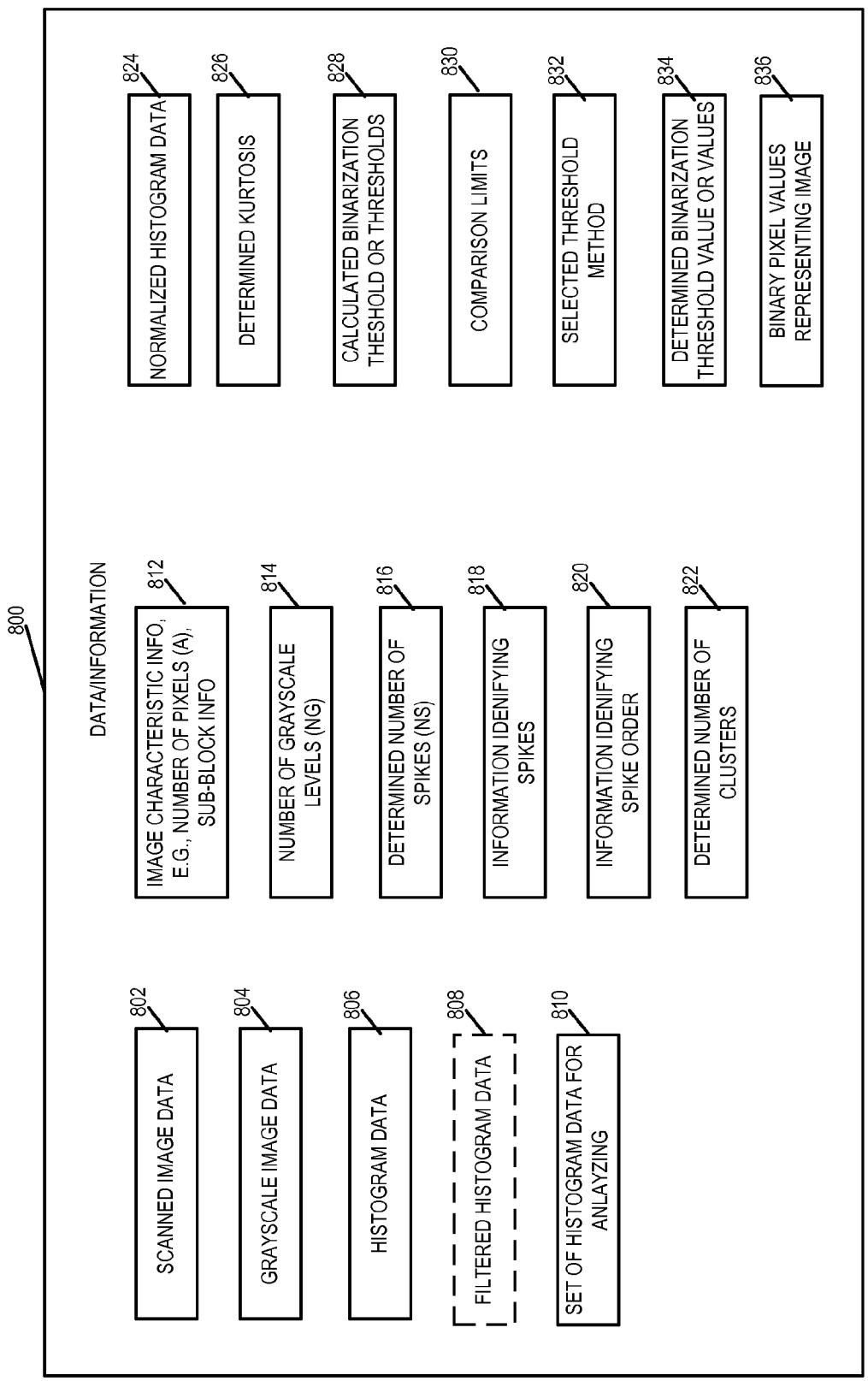
FIG. 8 is a drawing of exemplary data/information in accordance with various embodiments which may be included in data/information in the memory of the exemplary computer system of FIG. 1.

FIG. 8 is a drawing of exemplary data/information 800 in accordance with various embodiments. Data/information 800 may be included in data/information 114 in memory 116 of computer system 100 of FIG. 1. Data/information 800 includes scanned image data 802, grayscale image data 804, histogram data 806, filtered histogram data 808, and set of histogram data for analyzing 810. Data information 800 also includes image characteristic information 812, e.g. number of pixels in the image, information identifying the number and location of sub-blocks in the image, etc., number of grayscale levels (NG) 814, e.g., 256 grayscale levels, a determined number of spikes (NS) 816, information identifying the spikes 818, information identifying spike order 820, a determined number of clusters 822, normalized histogram data 824, a determined kurtosis 826, a calculated global binarization threshold value or a set of calculated local binarization threshold values 828, comparison limits 830, a selected threshold method 832, e.g., one of a plurality of alternative global thresholding determination methods or local thresholding, a determined binarization threshold value or values 834, e.g., in accordance with the selected method, and a set of binary pixel values representing the image 836.

Figures 9, 9A, 9B:
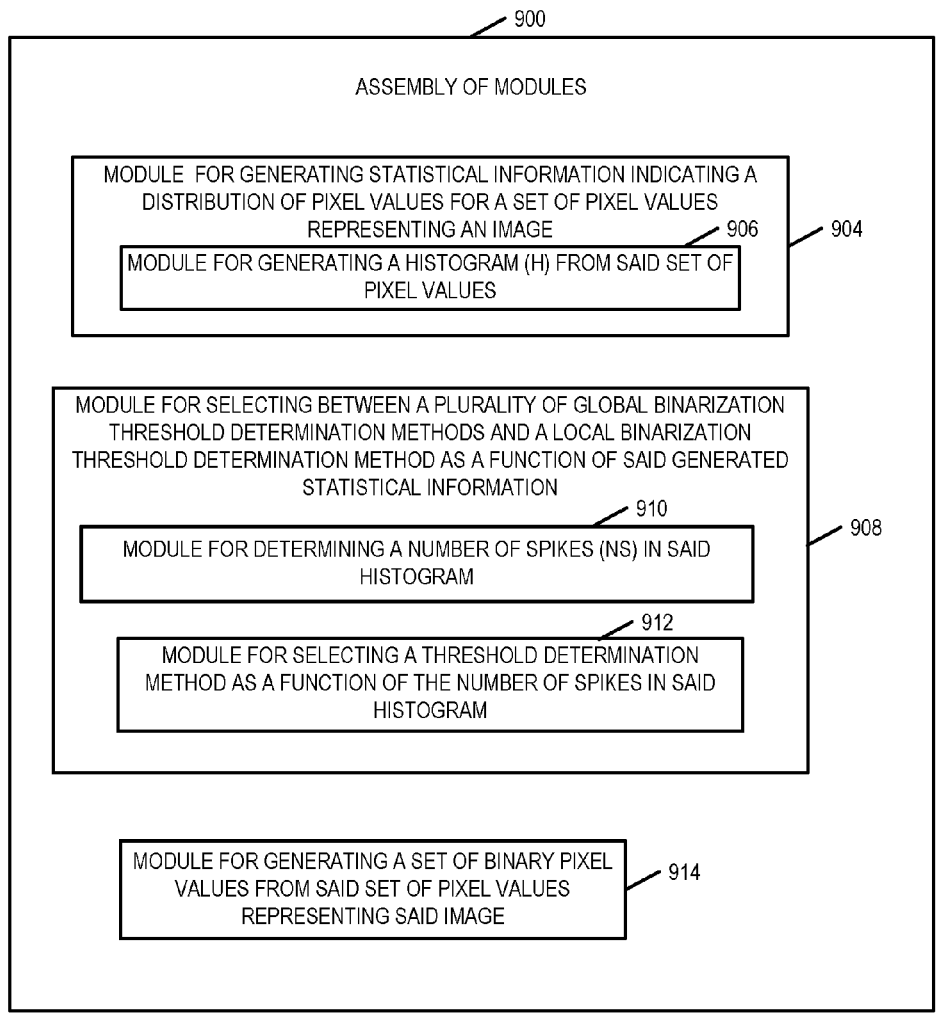
FIG. 9, comprising the combination of FIG. 9A and FIG. 9B, is an assembly of modules 900 which may be included in the memory of the exemplary computer system of FIG. 1.
Figure 9B:
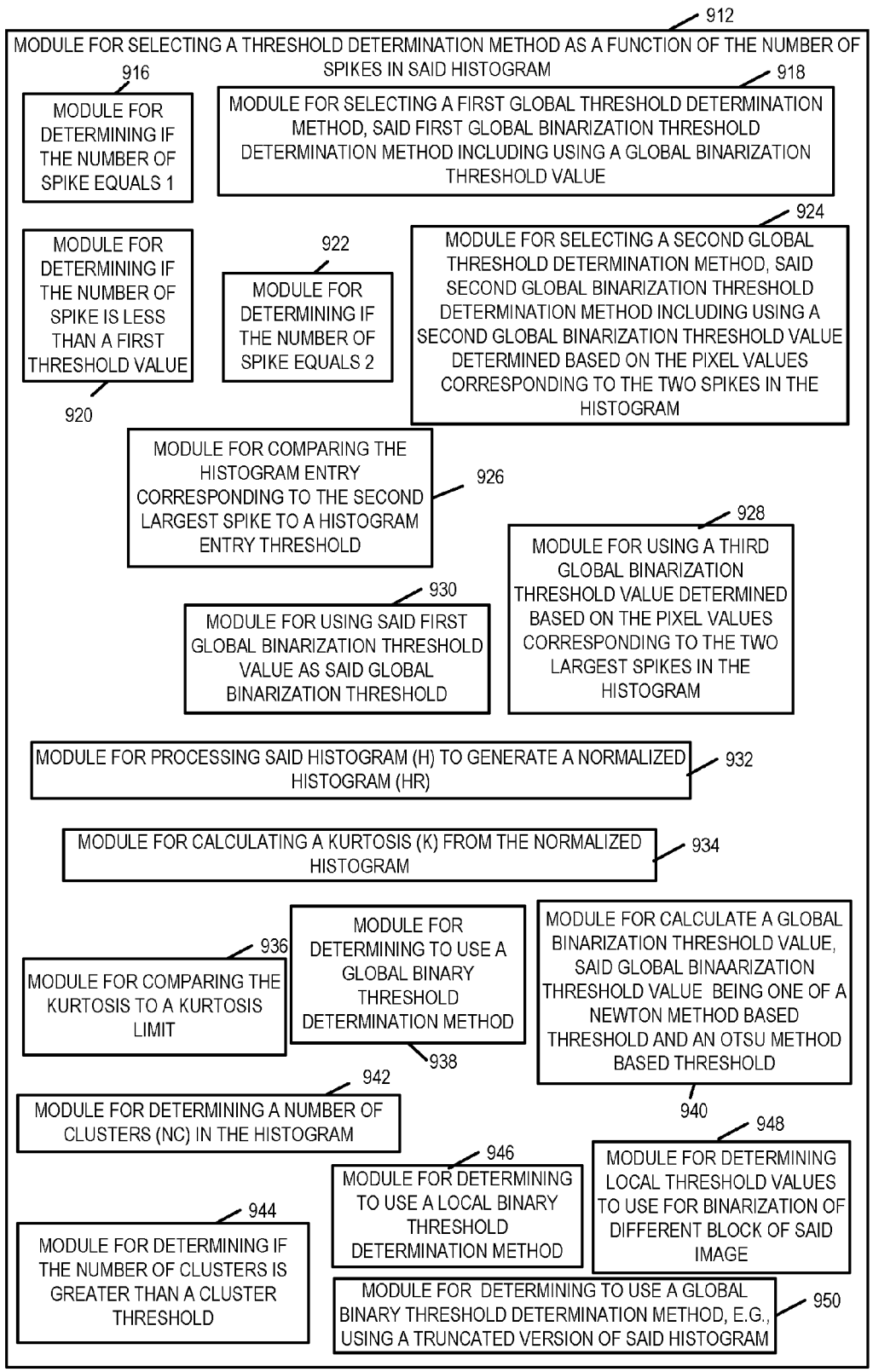

FIG. 9, comprising the combination of FIG. 9A and FIG. 9B is an assembly of modules 900 which may be included in modules 112 of memory 116 in computer system 100 of FIG. 1. In some embodiments, each of the modules in assembly of module 900 may correspond to a corresponding step or sub-step in flowchart 600 of FIG. 6. For example, module 904 for generating statistical information indicating a distribution of pixel values for a set of pixel values representing an image may perform corresponding step 604 of flowchart 600 of FIG. 6. Assembly of modules 900 includes a module 904 for generating statistical information indicating a distribution of pixel values for a set of pixel values, a module 908 for selecting between a plurality of global binarization threshold determination methods and a local binarization threshold determination method as a function of said generated statistical information, and a module 914 for generating a set of binary pixel values from said set of pixel values representing the image. Module 904 includes a module 906 for generating a histogram from said set of pixel values representing an image.

Module 908 includes a module 910 for determining a number of spikes in said histograms and a module 912 for selecting a threshold determination method as a function of the number of spikes in said histogram. Module 912 includes a module 916 for determining if the number of spikes in the histogram equals one and controlling the operation as a function of the determination, a module 918 for selecting a first global threshold determination method when said number of spikes equals 1, said first global threshold determination method including using a global binarization threshold value, a module 920 for determining if the number of spikes is less than a first threshold value and controlling the operation as a function of the determination, a module 922 for determining if the number of spikes equals two and controlling operation as a function of the determination, a module 924 for selecting a second global threshold determination method when said number of spikes equals two, said second global binarization threshold determination method including using a second global binarization threshold value determined based on the pixel values corresponding to the two spikes in the histogram, a module 926 for comparing the histogram entry corresponding to the second largest spike to a histogram entry threshold and for controlling the operation as a function of the result of the comparison, a module 928 for using a third global binarization threshold value determined based on the pixel values corresponding to the two largest spikes in the histogram when the comparison indicates that the histogram entry corresponding to the second largest spike is larger than the histogram entry threshold, and a module 930 for using said first global binarization threshold value as said global binarization threshold.

Module 912 further includes a module 932 for processing said histogram to generate a normalized histogram, a module 934 for calculating a kurtosis from the normalized histogram, a module 936 for determining if the kurtosis is greater than a kurtosis limit and controlling operation as a function of the determination, a module 938 for determining to use a global binary threshold determination method when the comparison of the kurtosis to the kurtosis threshold indicates that the kurtosis exceeds the kurtosis threshold and the determined number of spikes is greater than or equal to the first threshold value, and a module 940 for calculating a global binarization threshold value, said global binarization threshold value being one of a Newton method based threshold and an Otsu method based threshold. Module 912 further includes a module 942 for determining a number of cluster in the histogram, a module 944 for determining if the number of clusters is greater than a cluster threshold and controlling operation as a function of the determination, a module 946 for determining to use a local binary threshold determination method when the kurtosis does not equal the kurtosis threshold and when the number of clusters exceeds a cluster threshold, a module 948 for determining local threshold values to use for binarization of different blocks of said image, and a module 950 for determining to use a global binary threshold determination method, e.g., a global binary threshold determination method where the global binarization threshold value may be, and sometimes is, based on a truncated version of the histogram.

In some embodiments, the global binarization threshold value of module 918 is a middle range value in a range of possible pixel values. For example, if the range of possible pixel values is [0, . . . 255], in some embodiments, the global binarization threshold value of module 918 is 127. In some embodiments, the second global binarization threshold value equals the average of the pixel values corresponding to the two spikes in the histogram. In some embodiments, the histogram entry threshold is a function of a predetermined constant and the number of pixels in the image being processed. For example, histogram entry threshold is value P3, where $P3=P3_1*A$, where A is the number of pixels in the image being processed and where $P3_1$ is a fixed predetermined parameter value, e.g., 0.4. In some embodiments, the first threshold value used by module 920 is a predetermined constant. For example, in some embodiments, the first threshold value is P2 and P2 is a predetermined constant, e.g., 12. In some embodiments, the third global binarization threshold value is equal to the second global binarization threshold value. In various embodiments, module 648 for determining local threshold values uses the Otsu method to determine the local threshold values.

Various aspects and/or features used in some, but not necessarily all, exemplary embodiments will be described. In some embodiments pre-processing of an input image is performed to convert a color image into gray scale image. In some embodiments, one or more histogram computation as performed. In some one-pass histogram implementations, multiple sets of histograms are computed, e.g., three sets of histograms: a global histogram, overlapping local histograms, as well as the non-overlapping local histograms. The global histogram is for classification and also for the computation of a global threshold. In some embodiments, the overlapping local histogram is for the computation of local threshold, and the non-overlapping histogram is for the computation of local variance. In some embodiments, if the local variance is low, the entire block is classified as background (white). In some other embodiments, the non-overlapping local histograms are used for the computation of the local thresholds.

From the original global histogram, the number of spikes (nonzeronum) is computed, e.g., by counting how many gray levels that have a large number of image pixels, i.e. larger than totalpix/1000, where totalpix is the total number of pixels in the input image. If nonzeronum=1, meaning image has 1 color/gray level, then the image is binarized and the threshold is set to a middle value, e.g., 127 for a pixel value range [0, . . . 255]. If nonzeronum=2, the threshold is set to the halfway value between the locations of the two spikes. In case of 2<nonzeronum<10, the spikes are sorted based on their heights, if each of the top 2 spikes has more than 40% of total image pixels, then the threshold is set to the halfway value between the locations of the two spikes; otherwise, there is one significant large spike, which dominates, and any pixel that equals to it is labeled as background and any pixel that is not equal to it is foreground (text).

The histogram representing the image which is being processed might have spike noises due to the conversion of RGB image to gray image and/or due to other reasons. It is often desirable to remove such noise before some types of analysis. Median filtering and/or line-fitting smoothing filtering are, in some embodiments, applied to the histogram. To facilitate the identification of images that would benefit from a local thresholding approach, the global histogram is smoothed. There are two smoothing components: median filtering and line-fitting smoothing. The median filter effectively removes spikes in histogram. Then the median-filtered-histogram is smoothed by the line-fitting smoother which first integrates the histogram to get the cumulative histogram and then at each point on the cumulative histogram computes the slope. The smoothed histogram is made up of the slopes.

In various embodiments, an identified uni-modal (super-Gaussian) image is thresholded based on a Newton method, e.g., a Newton method with no iteration. The identification of super-Gaussianness, in some embodiments, is by kurtosis. The kurtosis is defined as $$k = \frac{\mu_4}{\sigma^4}$$

where $\mu_4$ is the fourth moment about the mean and $\sigma$ is the standard deviation.

Kurtosis is computed from the histogram. If the calculated kurtosis is larger than a kurtosis threshold, e.g., if the calculated kurtosis is larger than MIN_KURTOSIS_FOR_NEWTON_THRESHOLD, then the Newton based method is used to compute the threshold. In some embodiments, a relatively large value is set for the kurtosis threshold, e.g., 20. The slope is computed from the smoothed histogram. With that slope, the Newton threshold is computed. If the Newton threshold is a valid threshold, e.g., in the range of possible grayscale values, the calculated Newton threshold is used as a global threshold. In some embodiments, calculating a Newton threshold includes starting from the maximum location, and computing the average derivative and in that direction we have a line that approximates the histogram function. In this way we can find a threshold by locating where that line meets the x-axis. This threshold is referred as Newton threshold $T_{NT}$. If TNT is within the acceptable range, the calculated Newton Threshold is used as the global binarization threshold. However, if $T_{NT}$ is outside the acceptable range, e.g., outside [0,255], another global binarization threshold will be used. In some embodiments, if the calculated Newton Threshold is not a valid threshold, an Otsu method based threshold is calculated and used as the global threshold.

In some embodiments, an identified multi-modal image is determined to be locally thresholded. After smoothing, we count how many times the histogram goes up significantly. If the number is large, we proceed with local thresholding. In local thresholding, in some embodiments, we first compute the variance and if higher than a threshold, it is binarized with the threshold computed by the Otsu method. In the local thresholding method multiple local binarization thresholds are calculated and used, e.g., corresponding to different sub-blocks of the image.

For some type of images, global thresholding is used in which two provisional global thresholds are calculated and then one of the two alternatives is selected based upon statistical analysis. If the maximum of histogram is located near the maximum pixel range value, e.g., near 255, the histogram is truncated as a function of the maximum, e.g., at the maximum or slightly offset from the maximum. For example, in one embodiment, being located near 255 means being greater than 240. In one embodiment, the histogram truncation point is set to the maximum—20. This processing is to reduce the influence from background pixels. From the possibly truncated histogram, a first threshold is computed. The second one is computed after the histogram is truncated at the first threshold. Between the two, one of them is selected to binarize the image.

The techniques of various embodiments may be implemented using software, hardware and/or a combination of software and hardware. Various embodiments are directed to apparatus, e.g., an image processing system. Various embodiments are also directed to methods, e.g., a method of processing an image. Various embodiments are also directed to machine, e.g., computer, readable medium, e.g., ROM, RAM, CDs, hard discs, etc., which include machine readable instructions for controlling a machine to implement one or more steps of a method. In various embodiments after image binarization the image the binary image data is used to generate an image on a display device. The image may be, and in some embodiments is, an image of a document, person or other real world object.

In various embodiments apparatus described herein are implemented using one or more modules to perform the steps corresponding to one or more methods. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Various embodiments are directed to a physical computer readable medium including code for causing a computer to implement each of the steps of the various methods discussed in the present application. Thus, some embodiments are directed to a computer readable medium such as, e.g., a memory or optical disc, with code or other instructions for controlling a computer to implement the individuals steps shown in the flow charts of the present application.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., an image processing system.

In some embodiments modules are implemented using software, in other embodiments modules are implemented in hardware, in still other embodiments the modules are implemented using a combination of hardware and/or software.

Numerous additional variations on the methods and apparatus of the various embodiments described above will be apparent to those skilled in the art in view of the above description. Such variations are to be considered within the scope.

What is claimed is:

1. An image binarization method, the method comprising:
generating statistical information indicating a distribution of pixel values for a set of pixel values representing an image;
selecting between a plurality of global binarization threshold determination methods and a local binarization threshold determination method as a function of said generated statistical information; and
generating a set of binary pixel values from said set of pixel values representing said image.

2. The method of claim 1, wherein said generating statistic information includes generating a histogram from said set of pixel values.

3. The method of claim 2, wherein said plurality of global binarization threshold determination methods includes a first method which uses a truncated version of said generated histogram and wherein a second one of said plurality of global binarization threshold determination methods is a Newton based threshold determination method.

4. The method of claim 1, wherein selecting between a plurality of global binarization threshold determination methods and a local binarization threshold determination method includes:
determining a number of spikes in said histogram; and
selecting a threshold determination method as a function of the determined number of spikes in said histogram.

5. The method of claim 4, wherein selecting a threshold determination method includes selecting a first global threshold determination method when said number of spikes equals one, said first global threshold determination method including using a global binarization threshold value.

6. The method of claim 5, wherein said global binarization threshold value is a middle value in a range of possible pixel values.

7. The method of claim 5, wherein selecting a threshold determination method includes selecting a second global threshold determination method when said number of spikes equals two, said second global threshold determination method including using a second global binarization threshold value determined based on the pixel values corresponding to said two spikes in said histogram.

8. The method of claim 7, wherein selecting a threshold determination method includes comparing a histogram entry corresponding to the second largest spike to a histogram entry threshold; and
when the histogram entry corresponding to the second largest spike is larger than the histogram entry threshold using a third global binarization threshold value determined based on the pixel values corresponding to the two largest spikes in said histogram.

9. The method of claim 8, wherein said third global binarization threshold value is equal to said second global binarization threshold value.

10. The method of claim 8, wherein when the histogram entry corresponding to the second largest spike is less than or equal to the histogram entry threshold said global binarization threshold value is used as a global binarization threshold.

11. The method of claim 7, wherein selecting a threshold determination method includes selecting a global threshold determination method when said determined number of spikes is greater than two and less than a first threshold value.

12. The method of claim 11, wherein said first threshold value is 12.

13. The method of claim 11, further comprising:
when said determined number of spikes is greater than or equal to said first threshold value,
  processing said histogram to generate a normalized histogram;
  calculating a kurtosis from the normalized histogram;
  comparing the kurtosis to a kurtosis threshold; and
  determining to use a global binary threshold determination method when the comparison of the kurtosis to the kurtosis threshold indicates that the kurtosis exceeds the kurtosis threshold.

14. The method of claim 13, wherein when the kurtosis exceeds the kurtosis threshold the determined method of generating a global binary threshold includes:
  calculating a global threshold, said global threshold being one of Newton method based threshold and Otsu method based threshold.

15. The method of claim 13, wherein when the kurtosis does not exceed the kurtosis threshold, the method further comprising:
  determining a number of clusters in the histogram; and
  when the number of clusters exceeds a cluster threshold,
    determine to use a local binary threshold determination method; and
    determine local threshold values to use for binarization of different blocks of said image.

16. The method of claim 15, wherein the local threshold values are determined using the Otsu method.

17. An apparatus for image processing comprising:
  a processor;
  a module for generating statistical information indicating a distribution of pixel values for a set of pixel values representing an image;
  a module for selecting between a plurality of global binarization threshold determination methods and a local binarization threshold determination method as a function of said generated statistical information; and
  a module for generating a set of binary pixel values from said set of pixel values representing said image.

18. The apparatus of claim 17, wherein said module for generating statistical information includes a module for generating a histogram from said set of pixel values.

19. The apparatus of claim 18, wherein said plurality of global binarization threshold determination methods includes a first method which uses a truncated version of said generated histogram and wherein a second one of said plurality of global binarization threshold determination methods is a Newton based threshold determination method.

20. A non-transitory physical computer readable having code stored thereon, the non-transitory physical computer readable medium comprising:
  code for causing a computer to generate statistical information indicating a distribution of pixel values for a set of pixel values representing an image;
  code for causing the computer to select between a plurality of global binarization threshold determination methods and a local binarization threshold determination method as a function of said generated statistical information; and
  code for causing the computer to generate a set of binary pixel values from said set of pixel values representing said image.

* * * * *